(12) United States Patent
Nolan et al.

(10) Patent No.: US 7,832,755 B2
(45) Date of Patent: Nov. 16, 2010

(54) MODULAR CHASSIS FOR STROLLER

(75) Inventors: Patrick Nolan, Royersford, PA (US); Michael A. Dotsey, Pottstown, PA (US)

(73) Assignee: Graco Children's Products Inc., Atlanta, GA (US)

( * ) Notice: Subject to any disclaimer, the term of this patent is extended or adjusted under 35 U.S.C. 154(b) by 935 days.

(21) Appl. No.: 11/495,161

(22) Filed: Jul. 28, 2006

(65) Prior Publication Data

US 2007/0075525 A1    Apr. 5, 2007

Related U.S. Application Data

(60) Provisional application No. 60/717,241, filed on Sep. 16, 2005.

(51) Int. Cl.
*B62B 7/00* (2006.01)
*B62B 9/12* (2006.01)

(52) U.S. Cl. .................. 280/642; 280/643; 280/648; 280/650; 280/658; 280/47.18; 280/47.41; 280/47.38

(58) Field of Classification Search .......... 280/638, 280/639, 642, 643, 647, 648, 650, 657, 658, 280/47.17, 47.18, 47.25, 47.34, 47.38, 47.41, 280/79.2
See application file for complete search history.

(56) References Cited

U.S. PATENT DOCUMENTS

| | | | |
|---|---|---|---|
| 1,707,186 A * | 3/1929 | Chatfield | .................. 280/658 |
| 2,512,995 A | 6/1950 | Berger | |
| 5,536,027 A * | 7/1996 | Gollub | ..................... 280/30 |
| 5,647,601 A * | 7/1997 | Potter et al. | ............. 280/47.38 |
| 6,099,022 A * | 8/2000 | Pring | ........................ 280/648 |
| 6,189,979 B1 | 2/2001 | Wu | |
| 6,250,654 B1 | 6/2001 | Willis | |
| 6,302,412 B1 * | 10/2001 | Worth et al. | .................. 280/30 |
| 6,398,233 B1 * | 6/2002 | Liang et al. | .................. 280/30 |
| 6,443,467 B1 * | 9/2002 | Black | ..................... 280/47.38 |
| 2005/0127640 A1 * | 6/2005 | Worth et al. | ................ 280/642 |

FOREIGN PATENT DOCUMENTS

| | | |
|---|---|---|
| CN | 2072499 U | 3/1991 |
| CN | 2298986 Y | 12/1998 |
| CN | 2335860 Y | 9/1999 |
| CN | 2456993 Y | 10/2001 |

(Continued)

OTHER PUBLICATIONS

International Search Report and Written Opinion issued on Jun. 4, 2007, in related International application No. PCT/US2006/061212.

(Continued)

*Primary Examiner*—S. Joseph Morano
*Assistant Examiner*—John R Olszewski
(74) *Attorney, Agent, or Firm*—Lempia Braidwood LLC

(57) ABSTRACT

A modular chassis of a stroller system includes a body, a front wheel mount on the body, a rear wheel mount on the body, and at least one stroller frame mount on the body. The stroller frame mount is configured to couple releasably and interchangeably a first stroller frame configuration and a second stroller frame configuration different from the first stroller frame configuration to the body.

56 Claims, 25 Drawing Sheets

FOREIGN PATENT DOCUMENTS

| | | |
|---|---|---|
| DE | 200 16 909 | 1/2001 |
| DE | 199 40 779 | 3/2001 |
| DE | 203 13 208 | 10/2003 |
| FR | 2 260 481 | 5/1975 |
| FR | 2 260 481 | 9/1975 |
| FR | 2 774 647 | 8/1999 |
| GB | 1 122 058 | 7/1968 |
| JP | 10-258741 A | 9/1998 |
| JP | 2001-151119 A | 6/2001 |
| JP | 2001-239942 A | 9/2001 |
| WO | WO 02/092411 | 11/2002 |
| WO | WO 2004/067352 | 8/2004 |
| WO | WO 2006/076880 | 7/2006 |

OTHER PUBLICATIONS

Partial European Search Report issued in related European Patent Application No. 06019191.3 mailed Sep. 17, 2009.

Extended European Search Report issued in related European Patent Application No. 06019191.3, mailed Apr. 19, 2010.

\* cited by examiner

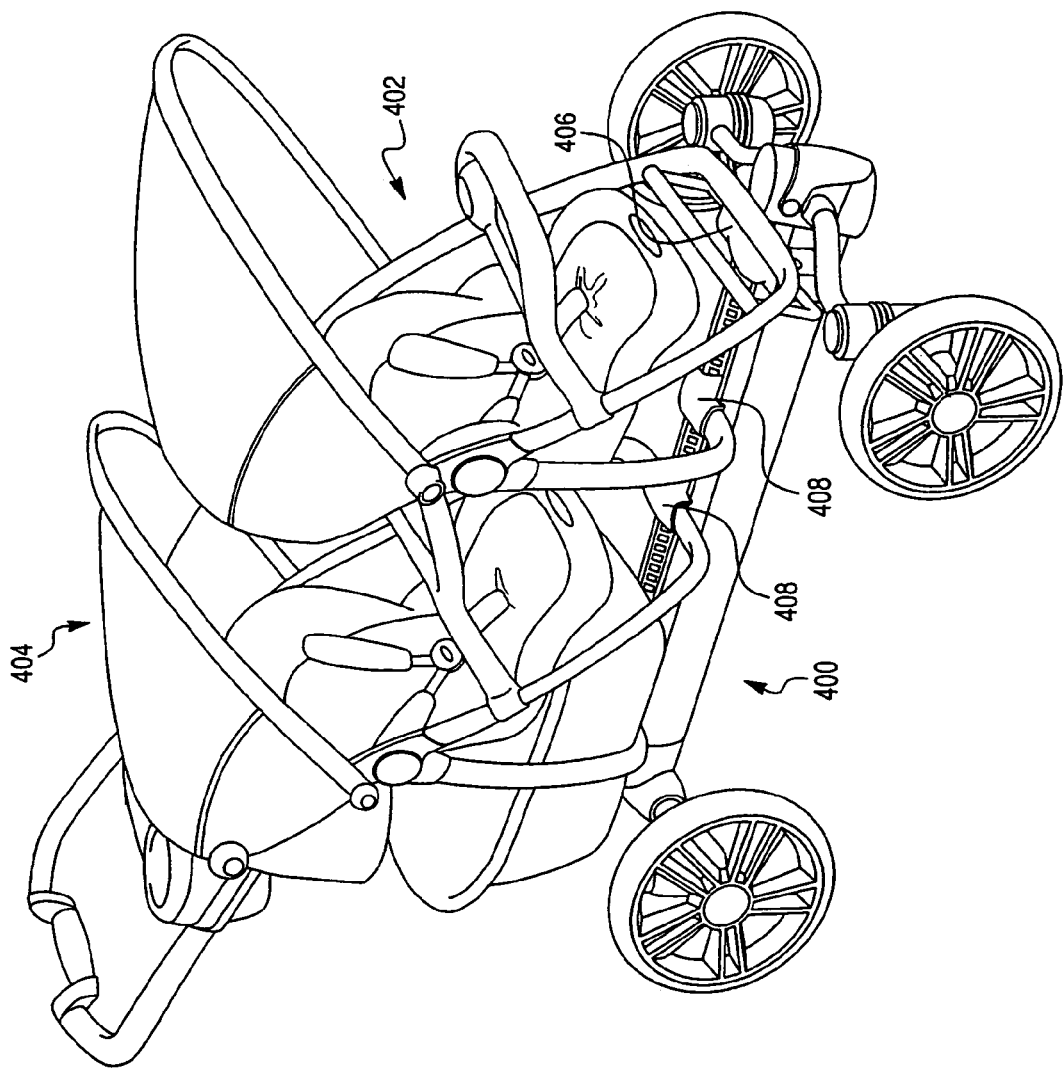

MODULAR CHASSIS FOR STROLLER

RELATED APPLICATION DATA

This patent claims the priority benefit of U.S. provisional patent application Ser. No. 60/717,241, filed on Sep. 16, 2005.

FIELD OF THE INVENTION

This invention relates to a stroller system, a modular chassis that can be employed in the stroller system, and a method of manufacturing the stroller system. More specifically, this invention relates to a stroller system that includes a modular chassis and stroller frame configurations configured to be interchangeably coupled to the modular chassis and to a method of manufacturing such a stroller system.

BACKGROUND OF THE INVENTION

Most strollers are comprised of multiple rigid members, typically metal tubing extrusions that are formed and cut to various lengths. The rigid members are fastened together by welds, rivets, screws, or other conventional fasteners to create a frame structure that is rigid when open and that has the ability to articulate and fold for storage/transportation. This method of fabrication requires many parts and involves multiple and costly labor intensive steps to complete a finished frame. The stroller's overall durability and quality have to be managed wherever fastening of the rigid members takes place.

Many stroller manufacturer make multiple stroller types including, for example, a lightweight stroller, a standard stroller, a double (or tandem) stroller, and a jogging stroller. Each stroller frame can have a unique design, fold, or style that dictates the need for new parts. That is, many stroller frame parts that are manufactured are unique to a specific frame design and are not shared across the entire stroller platform. This aspect of stroller design and construction increases the amount of individual parts, which increases assembly time and cost. In fact, a large part of the cost of a stroller is associated in the construction and material needed to create the stroller frame.

In the current market, the cost of raw goods, such as steel and aluminum, needed to make a stroller frame often exceeds the cost allowable to manufacture a stroller and remain profitable with traditional manufacturing techniques and current retail price points. Simplifying the construction process for the frame and reducing the amount of components required to construct a finished stroller product would provide favorable savings and reduction in assembly time for the manufacturer. This is a key problem facing manufacturers of strollers today if they wish to remain profitable in the stroller category.

On average, the US consumer tends to own six different strollers while raising children. Children develop physically in a rapid growth curve, and, not surprisingly, parents have different needs and utility expectations for strollers at each stage of child growth.

Parents of infants typically purchase a stroller that is larger and more cushioned for the child and that includes fully reclined seating (180°) so the infant can sleep. Parents of infants also desire a large storage area for a diaper bag, an extra change of clothes, formula, and other infant items. This stroller type typically is offered in a version that is termed a two-dimensional (2D) fold within the industry, meaning that the stroller folds in one plane, collapsing like a folding chair.

As the child becomes a toddler/preschooler, the parent needs less in terms of storage and comfort stroller features. The seat back of the stroller typically need not be reclinable to 180°; rather, the stroller seat back need only partially recline to make the seating a bit more comfortable. Since the child is older and can stay outdoors longer, the parent is now more mobile and, as a result, wants a stroller that is smaller in size and is compact when folded for getting on/off public transportation, in/out of trunks, or in/out of stores. In this regard, lightweight strollers that include a 2D fold are available for older children. Other strollers suitable for older children include umbrella or three-dimensional (3D) fold strollers. These umbrella strollers are designed to fold more compactly, collapsing in the vertical and horizontal axis.

In addition to these most prevalent needs, parents are also purchasing specialized strollers with specific utility for jogging or accommodating multiple children.

There exists a need for a stroller system that can address the manufacturing and cost concerns of stroller manufacturers, as well as the concerns of parents, who are faced with the prospect of purchasing multiple strollers as their children grow.

SUMMARY OF THE INVENTION

One aspect of the invention relates to a modular chassis of a stroller system that includes a body; a front wheel mount on the body; a rear wheel mount on the body; and at least one stroller frame mount on the body, the at least one stroller frame mount configured to couple releasably and interchangeably a first stroller frame configuration and a second stroller frame configuration different from the first stroller frame configuration to the body.

Another aspect of the invention relates to a stroller system that includes a modular chassis having a body and at least one stroller frame mount on the body; a first stroller frame configuration; and a second stroller frame configuration different from the first stroller frame configuration, wherein the at least one stroller frame mount is configured to couple releasably and interchangeably the first stroller frame configuration and the second stroller frame configuration to the body.

Another aspect of the invention relates to a method of manufacturing a stroller system that includes providing a first stroller frame configuration; providing a second stroller frame configuration different from the first stroller frame configuration; and providing a modular chassis having a body and at least one stroller frame mount on the body that is configured to couple releasably and interchangeably the first stroller frame configuration and the second stroller frame configuration.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 25 is a is a front perspective view of a tandem stroller for two children that includes an alternative modular chassis and a tandem stroller frame configuration, a front wheel assembly, and a rear wheel assembly coupled to the alternative modular chassis.

DETAILED DESCRIPTION OF THE PREFERRED EMBODIMENTS

Reference will now be made in detail to presently preferred embodiments of the invention, examples of which are illustrated in the accompanying drawings. An effort has been made to use the same reference numbers throughout the drawings to refer to the same or like parts.

Figure 1:
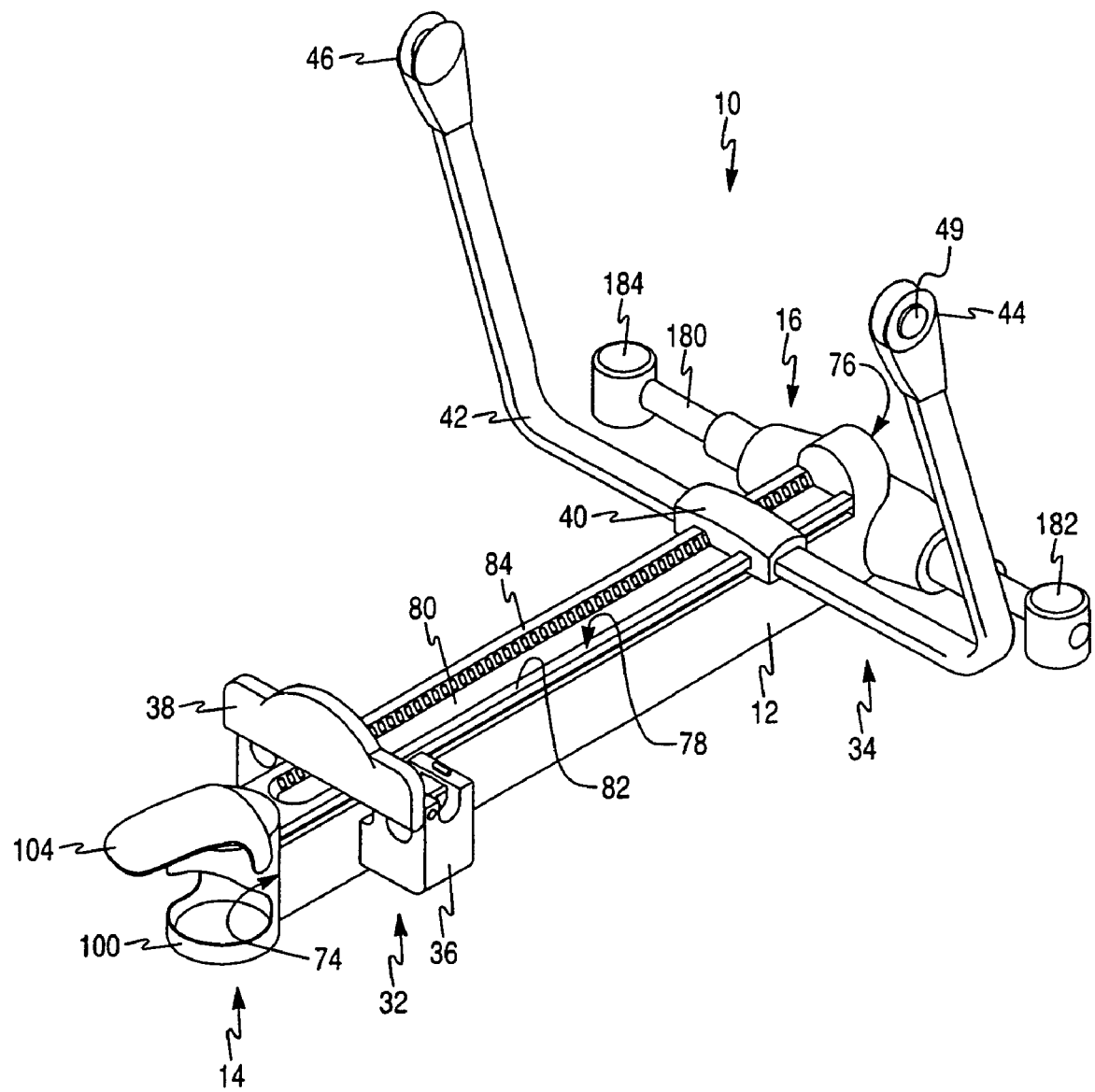
FIG. 1 is a front perspective view of a modular chassis for use on a stroller according to an embodiment of the invention.

FIG. 1 is a perspective view of an embodiment of a modular chassis 10 of a stroller system in accordance with the invention. The modular chassis 10 is constructed with standardized dimensions for flexibility and variety in use. The modular chassis 10 is designed to provide a single support structure or backbone for different stroller platforms, such as such as umbrella strollers, lightweight strollers, standard strollers, bassinet-type strollers, full-size "comfort" class strollers, and jogging strollers. In this regard, to create the varied stroller platforms, different stroller frame configurations, different front wheel assemblies, and different rear wheel assemblies can be coupled interchangeably to the modular chassis 10 as will be understood from the following description.

The modular chassis 10 generally includes a body 12, front and rear wheel mounts 14, 16 on the body 12, and at least one stroller frame mount, such as mounts 32, 34, on the chassis body 12. The front wheel mount 14 is configured to couple releasably and interchangeably a first front wheel assembly and another front wheel assembly, different from the first front wheel assembly, to the chassis body 12. Likewise, the rear wheel mount 16 is configured to couple releasably and interchangeably a first rear wheel assembly and another rear wheel assembly, different from the first rear wheel assembly, to the chassis body 12. Further, the stroller frame mount is configured to couple releasably and interchangeably a first stroller frame configuration and another stroller frame configuration, different from the first stroller frame configuration, to the chassis body 12. Because different front wheel assemblies, rear wheel assemblies, and stroller frame configurations can be coupled to the modular chassis 10, the modular chassis 10 enables a manufacturer and/or customer to customize a stroller to suit particular needs.

The modular chassis 10 provides several advantages to manufacturers and to consumers. For example, manufacturers can focus on quality control and manufacturing cost of a single part (the modular chassis) across multiple stroller platforms, rather than several unique parts specific to each stroller platform. A consumer can purchase a stroller that includes the modular chassis and then, when the consumer's needs change, can couple to the modular chassis a different stroller frame configuration, front wheel assembly, and/or rear wheel assembly to suit those changed needs and uses. Other advantages will become apparent in the following description.

Figure 2:
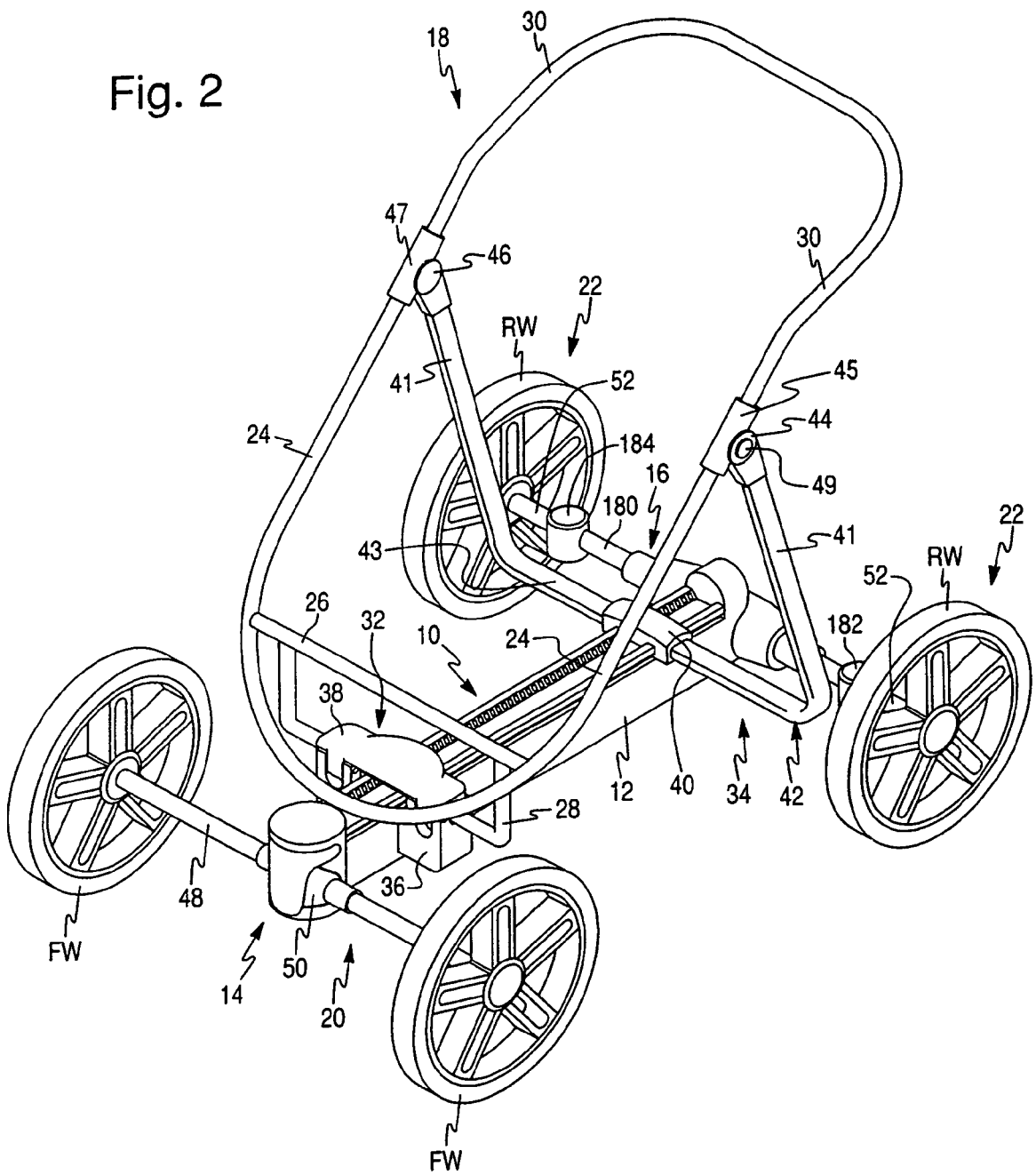
FIG. 2 is front perspective view of the modular chassis of FIG. 1 and a partial stroller frame configuration, a front wheel assembly, and a rear wheel assembly coupled to the modular chassis.
Figure 3:
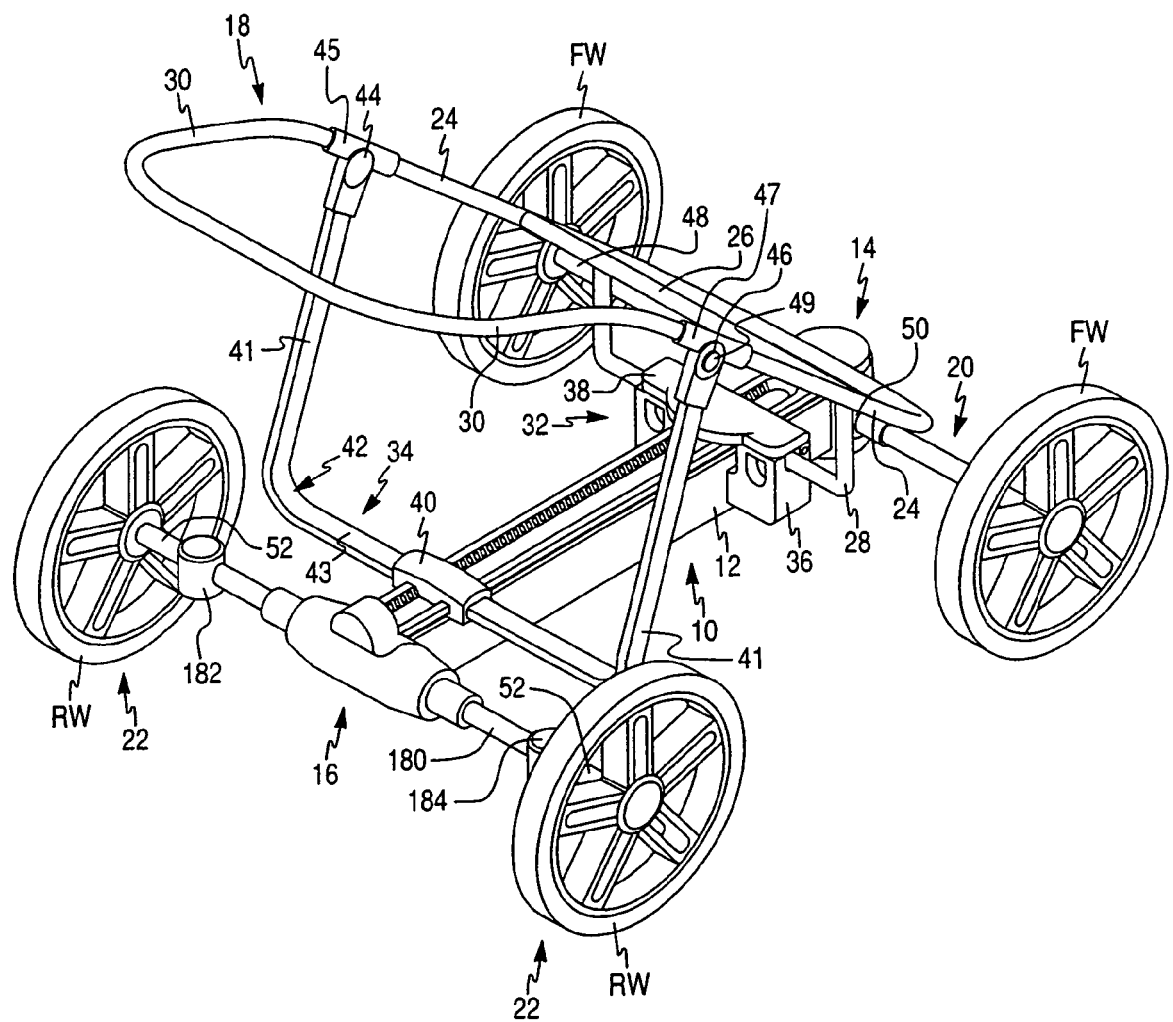
FIG. 3 is rear perspective view of FIG. 2.

FIGS. 2 and 3 show front and rear perspective views, respectively, of a stroller that includes a stroller frame configuration 18, a front wheel assembly 20, and a rear wheel assembly 22 coupled to the modular chassis 10. In this embodiment, the stroller frame configuration 18 includes front legs 24 joined at their front ends in a smooth curve; a front cross member 26, a U-shaped locking bar 28 connected to the cross member 26, and push arms 30 joined at their rear ends in a smooth curve. The push arms 30 each are connected to the respective front legs 24 at brackets 45; in a foldable embodiment of the stroller, the brackets 45 can slide relative to the front legs 24 and/or push arms 30 as the stroller folds. The stroller frame configuration 18 also can include additional frame members, such as framing for a child seating area (not shown) and a basket frame member (not shown). FIGS. 2 and 3 show only those frame members needed to understand how one type of stroller frame configuration can be coupled releasably to the modular chassis 10.

Figure 7A:
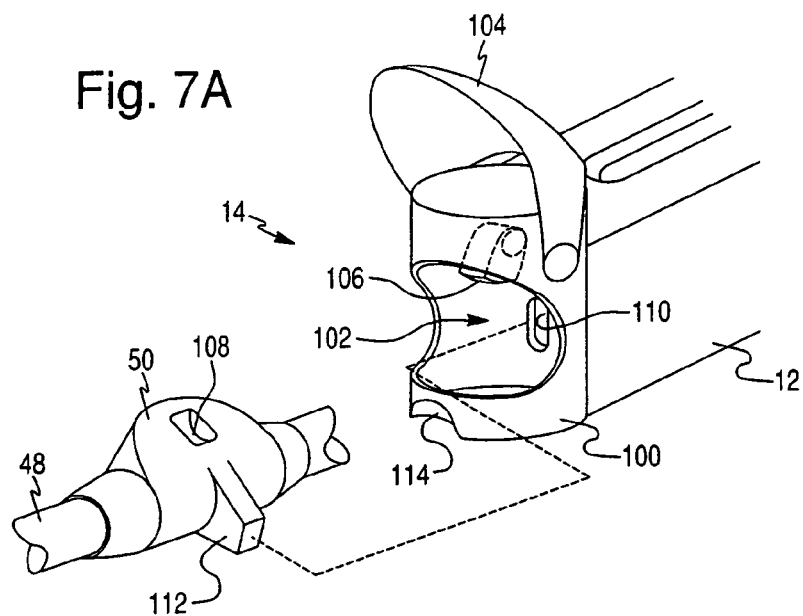
FIG. 7A is an exploded perspective view of a front wheel mount of the modular chassis and a front wheel connector of a front wheel assembly.

The front wheel assembly 20 generally includes a front wheel axle 48, a front wheel connector 50 located on an intermediate portion of the axle 48, between first and second ends of the axle 48, and a number of front wheels FW, typically either one or two wheels, at each of the first and second ends of the axle 48. The front wheel mount 14 of the modular chassis 10, which will be described in more detail in connection with FIGS. 7A-7A, is designed to couple releasably the front wheel connector 50 of the front wheel assembly 20 to the chassis body 12.

The rear wheel assembly 22 generally includes rear wheels RW and rear axle extensions 52 that can be coupled releasably to rear wheel connectors 54 of the rear wheel mount 16. The rear axle extensions 52 can include swivels to enable the rear wheels to rotate relative to the fixed rear wheel mount 16. The rear wheel mount 16 of the modular chassis will be described in more detail below.

As mentioned above, the stroller frame configuration 18 is coupled to the chassis body 12 by at least one stroller frame mount. In the embodiment of FIGS. 1-3, the modular chassis 10 includes a first stroller frame mount 32 fixedly mounted to the body 12 and a second stroller frame mount 34 slidably mounted to the body 12. The first and second stroller frame mounts 32, 34 are configured to couple a desired stroller frame configuration, such as stroller frame configuration 18, to the chassis body 12. The stroller frame configuration 18 also can be decoupled from the first and second mounts 32, 34 and replaced by a different stroller frame configuration to create a different type of stroller.

Figure 26:
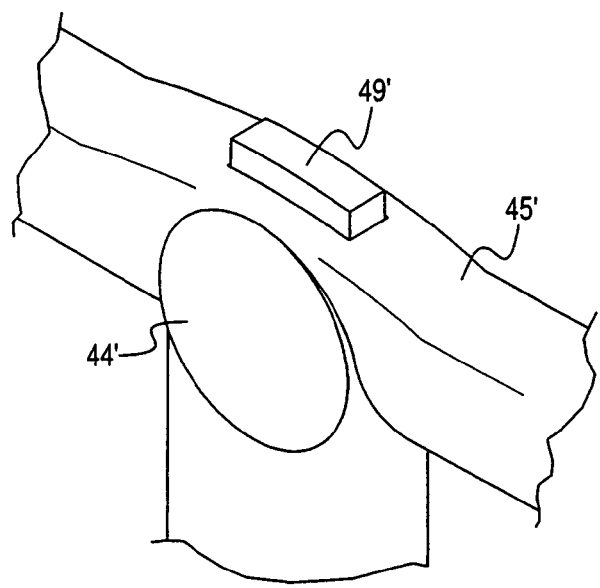
FIG. 26 is an enlarged perspective view of an embodiment of a latch member of a second stroller frame mount of the modular chassis and a corresponding latch member of a stroller frame configuration.

As can be seen in FIGS. 1-3, the first stroller frame mount 34 generally includes brackets 36 and a bracket cover 38 to couple releasably to a frame member, such as the locking bar 28, of the stroller frame configuration. The first stroller frame mount will be described in more detail in connection with FIGS. 12A-12D. The second stroller frame mount 34 generally includes a shuttle 40, a tube 42 having an intermediate portion mounted to the shuttle 40, a first latch 44 at a first end of the tube 42, and a second latch 46 at a second end of the tube 42. The first and second latches 44, 46 can couple releasably to the stroller frame configuration 18 at respective frame latches 45 of the stroller frame configuration 18. In this regard, each of the latches 44, 46 includes a button actuator 49 that can be depressed to decouple the stroller frame configuration 18 from the modular chassis 10. Alternatively, as shown in FIG. 26, the actuator button 49' can be located on the frame latch 45' rather than on the chassis latch 44'. The second stroller frame mount 34 will be described in more detail in connection with FIG. 13, and latching between chassis latches 44, 46 and frame latches 45, 47 will be described in more detail in connection with FIGS. 26-28.

Although this embodiment includes two stroller frame mounts 32, 34, it will be understood that, in other embodiments, the modular chassis 10 can include only one stroller frame mount, either fixed or slidable, or two or more stroller frame mounts, all fixed, all slidable, or any combination of fixed and slidable.

Figure 4:
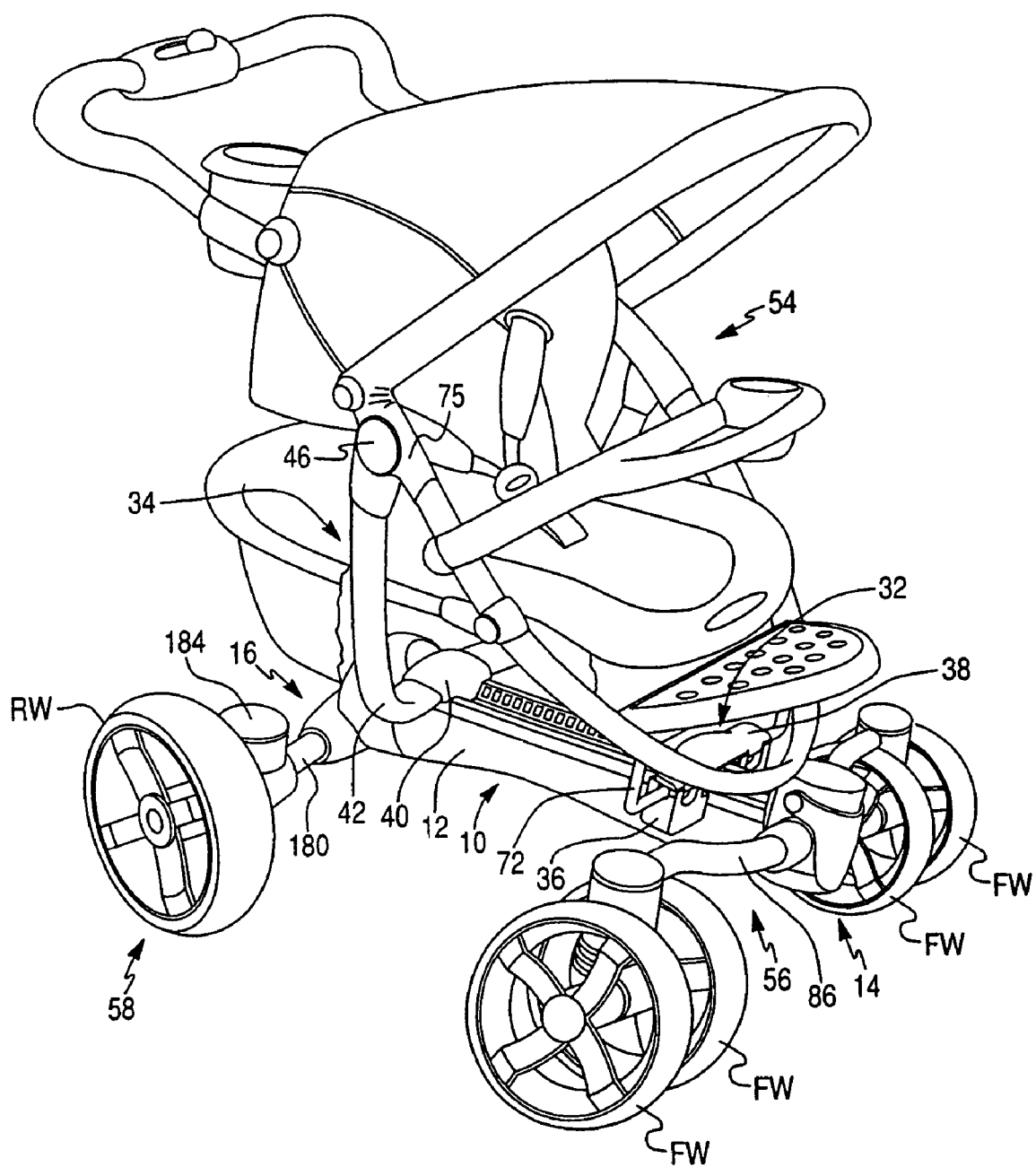
FIG. 4 is a front perspective view of a standard stroller that includes the modular chassis of FIG. 1 and a first stroller frame configuration, a front wheel assembly, and a rear wheel assembly coupled to the modular chassis.
Figure 5:
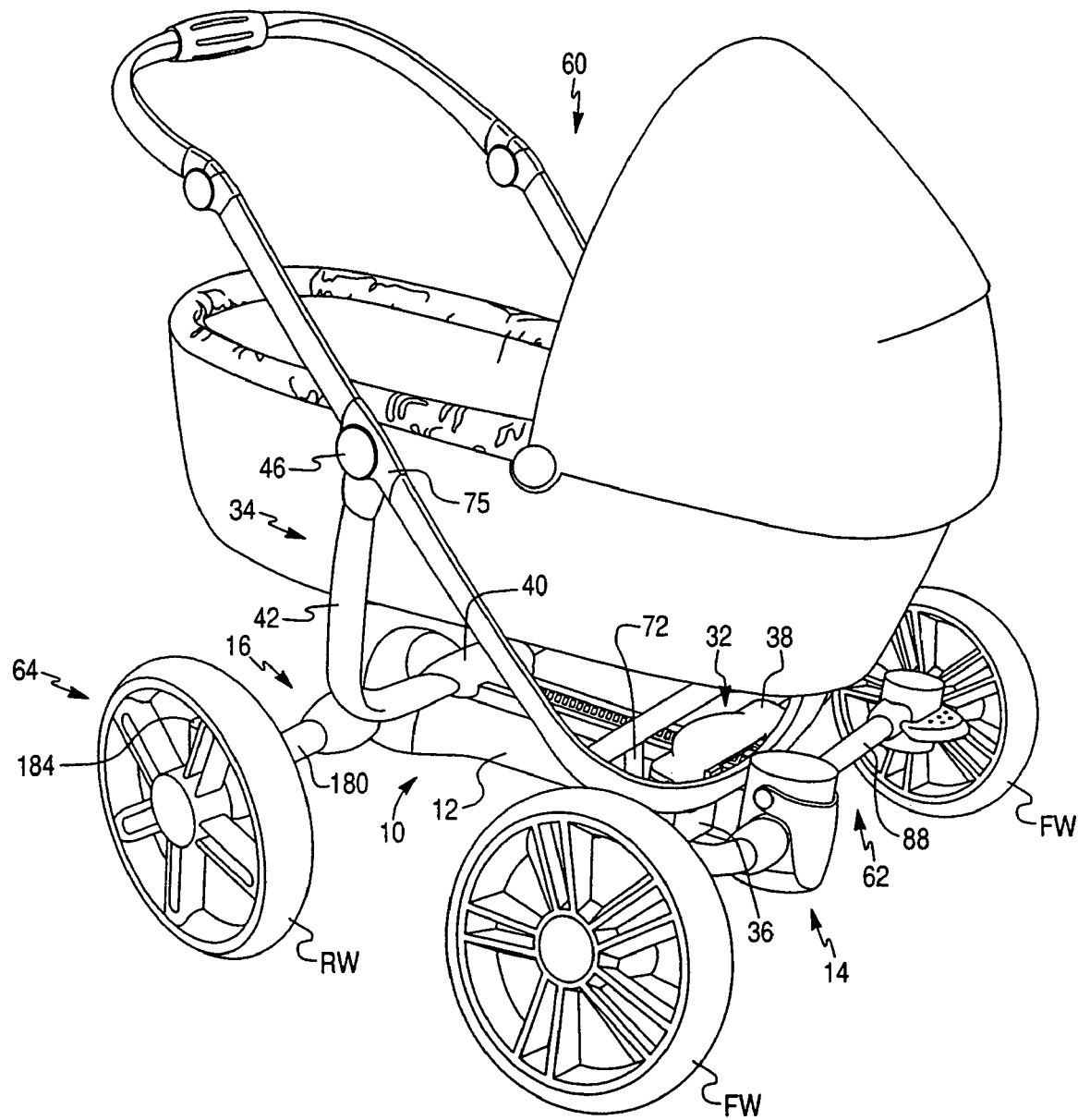
FIG. 5 is a front perspective view of a bassinet-type stroller that includes the modular chassis of FIG. 1 and a second stroller frame configuration, a front wheel assembly, and a rear wheel assembly coupled to the modular chassis.
Figure 6:
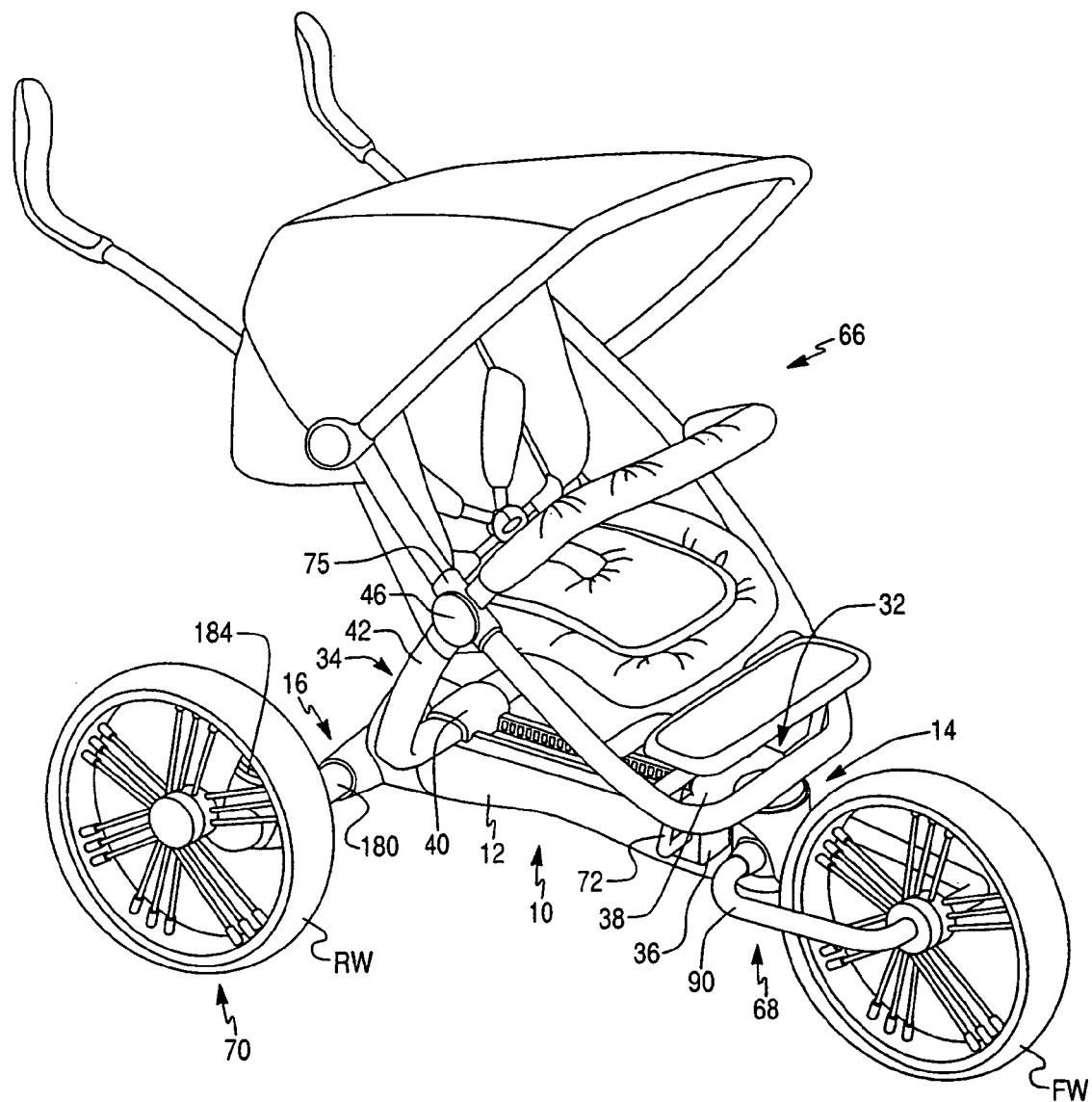
FIG. 6 is a front perspective view of a jogging stroller that includes the modular chassis of FIG. 1 and a third stroller frame configuration, a front wheel assembly, and a rear wheel assembly coupled to the modular chassis.

FIGS. 4-6 show examples of the various stroller platforms that can utilize the modular chassis 10. FIG. 4, for example, shows modular chassis 10 coupled with a stroller frame configuration 54, a front wheel assembly (a four-wheel assembly) 56, and a rear wheel assembly 58 (a two-wheel assembly) to create a standard stroller. FIG. 5 shows modular chassis 10 coupled to a different stroller frame configuration 60, a different front wheel assembly (a two-wheel assembly) 62, and a different rear wheel assembly (again, a two-wheel assembly) 64 to create a bassinet-type stroller. FIG. 6 shows modular chassis 10 coupled to another stroller frame configuration 66, another front wheel assembly (a one-wheel assembly) 68, and another rear wheel assembly 70 (again, a two-wheel assembly) to create a jogging stroller. The same support structure, i.e., the modular chassis 10, is used as the core framework for each of these strollers. It can be envisioned how the modular chassis 10 could also accommodate an umbrella stroller, a lightweight stroller, and other stroller types.

Each of stroller frame configurations 54, 60, 66 includes a frame member, illustrated as a locking bar 72, to couple releasably to the first stroller frame mount 32. Each configuration 54, 60, 66 also includes frame latches 75 to which the latches 44, 46 of the second stroller frame mount 34 can couple releasably. Apart from these common attachment points, the stroller frame configurations can have varied forms and utilities.

The structure of the chassis body 10, the front and rear wheel mounts 14, 16, and the first and second stroller frame mounts 20, 22 will now be described. As can be seen best in FIG. 1, the chassis body 12 can be formed as a center rail or beam and can be generally rectangular in shape. The chassis body 12 has a front end 74, a rear end 76, and an upper surface 78 that includes a longitudinal track 80. The track 80 can extend along the entire upper surface 78, or part way along the upper surface 78, between the front and rear ends 74, 76. In addition, the track 80, which can be formed of such material, but not limited, to a glass nylon material, can have a pair of opposed, upstanding walls 82, 84, along which the second stroller frame mount 34 can slide, as will be described in connection with FIG. 13.

The chassis body 12 can be manufactured by various manufacturing methods including, but not limited to, water injection molding/gas assist molding, conventional injection molding, or blow molding, or the body 12 can be manufactured as an extruded metal rail, a hydroformed metal rail, or a sheet formed or laminate composite rail. In addition, the chassis body 12 can be formed of various materials including, but not limited to, metal, plastic, wood, or composites/laminates. The body 12 can be manufactured of these various materials and perform similarly by virtue of designing for the material's inherent properties.

The front wheel mount 14 is located at the front end 74 of the chassis body 12, as shown in FIG. 1. The front wheel mount 14 can receive a front wheel axle of a desired front wheel assembly. For example, in FIG. 4, the front wheel mount 14 receives a front wheel axle 86 of a first front wheel assembly 56; in FIG. 5, the front wheel mount 14 receives a differently shaped front wheel axle 88 of a second front wheel assembly 62; and, in FIG. 6, the front wheel mount 14 receives another front wheel axle 90 of a third front wheel assembly 68. Each of these front wheel axles 86, 88, 90 includes a similarly shaped front wheel connector (like front wheel connector 50 of FIG. 1) that engages the front wheel mount 14.

Figure 7B:
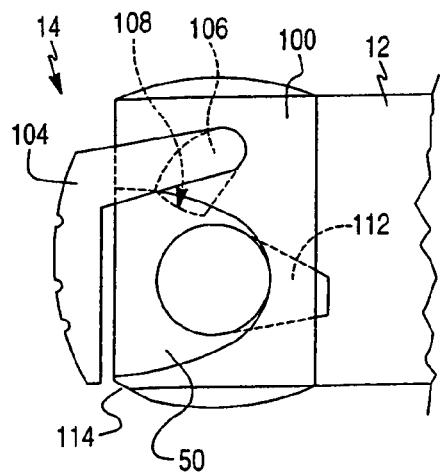
FIG. 7B is a side elevation view of the front wheel mount and the front wheel connector of FIG. 7A in a lock position.
Figure 7C:
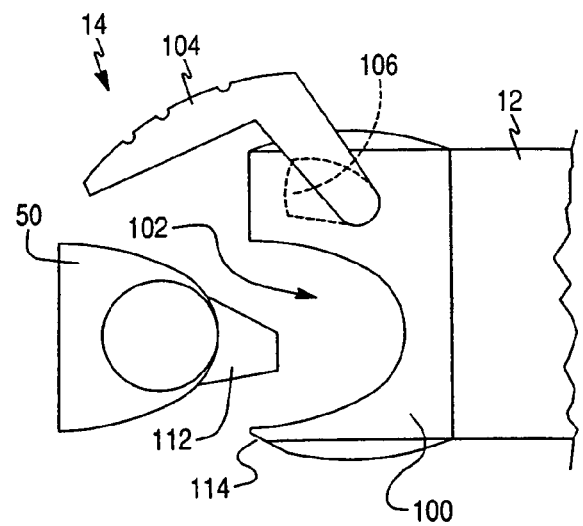
FIG. 7C is a side elevation view of the front wheel mount and the front wheel connector of FIG. 7A in an unlock position.

An embodiment of the engagement of the front wheel connector and the front wheel mount will now be described with reference to FIGS. 7A-7C. In this embodiment, the front wheel mount 14 includes a housing 100 having a cavity 102 to receive a front wheel connector 50 of front wheel assembly 20. The front wheel mount 14 also includes a lever 104 movably mounted to the housing 100 and a cam 106 mounted to the lever 104 and extending into the cavity 102. The cam 106 is shaped to engage a cam surface 108 on the front wheel connector 50. The housing 100 also includes a slot 110 that is dimensioned to receive a finger 112 on the front wheel connector 50. Engagement of the finger 112 in the slot 110 properly aligns the front wheel connector 50 in the cavity 102 and prevents rotation of the front wheel axle 48 relative to the front wheel mount 14. To couple the front wheel connector 50 to the front wheel mount 14, the lever 104 can be rotated from its unlock position, as shown in FIG. 7A, to its lock position, as shown in FIG. 7B. As the lever 104 rotates, the cam 106 engages the cam surface 108 to lock the front wheel connector 50 in place. To decouple the front wheel connector 50 from the front wheel mount 14, the lever 104 can be swung up, as shown in FIG. 7C, which causes the cam 106 to disengage from cam surface 108. Front wheel assembly 20 then can be removed and interchanged for another front wheel assembly. The housing 100 can have a beveled surface 114 to provide clearance for a user's finger(s) to operate lever 104.

Figure 8A:
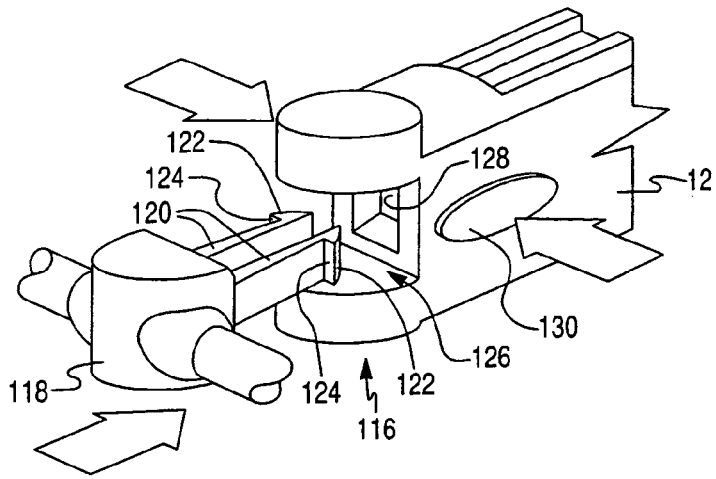
FIG. 8A is an exploded perspective view of an alternative front wheel mount of the modular chassis and an associated, alternative front wheel connector of the front wheel assembly.
Figure 8B:
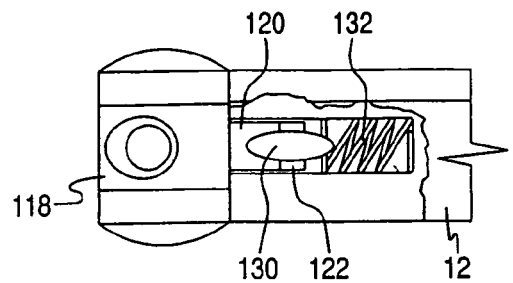
FIG. 8B is a partial cut-away side elevation view of the front wheel mount and the front wheel connector of FIG. 8A in a lock position.

Alternative front wheel mounts that can be employed on a modular chassis of a stroller system can be envisioned. For example, FIGS. 8A and 8B illustrate an alternative front wheel mount 116 of a modular chassis and an associated, alternative front wheel connector 118 of a front wheel assembly. The front wheel connector 118 includes a pair of locking clips 120 that each have a ramped surface 122 and a locking shoulder 124. The locking clips 120 can be flexed toward each other. The front wheel mount 116 includes a cavity 126 to receive the front wheel connector 118, a slot 128 to receive the locking clips 120, and release buttons 130 that can be depressed to release the locking clips 120 from the slot 128. The front wheel mount 116 also can include a spring 132 positioned to assist in ejecting the front wheel connector 118 from the front wheel mount 116 when the side release buttons 130 are depressed. To couple the front wheel connector 118 to the front wheel mount 116, the locking clips 120 are inserted through the slot 128, with the ramped surfaces 122 guiding the clips 120 into the slot 128 and flexing the clips 120 toward each other, until the shoulders 124 pass the slot 128. The clips 120 then resume their unflexed state, and the shoulders 124 prevent the locking clips 120 from passing back through the slot 128. To decouple the front wheel connector 118 from the front wheel mount 116, the side release buttons 130 are depressed, which flexes the locking clips 120 toward each other until the shoulders 124 clear the sides of the slot 128. The spring 132 then pushes the locking clips 120 backwards through the slot 128, decoupling the front wheel connector 118 from the front wheel mount 116.

Figure 9A:
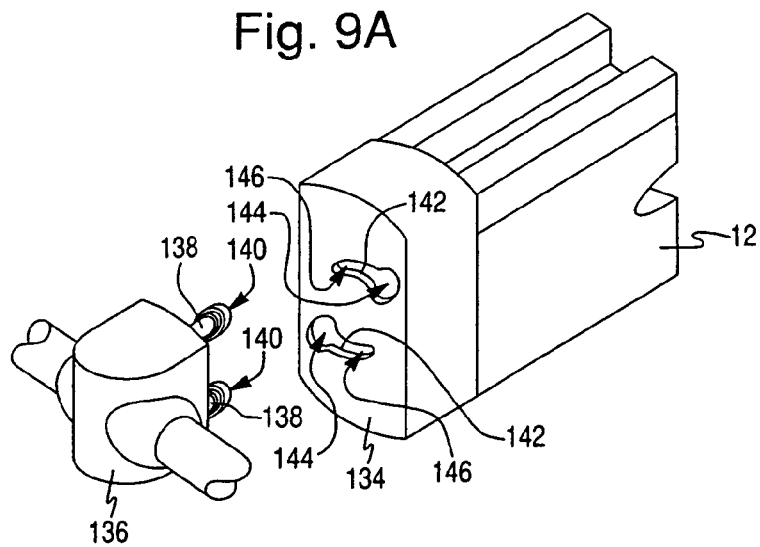
FIG. 9A is an exploded perspective view of another alternative front wheel mount of the modular chassis and an associated, alternative front wheel connector of the front wheel assembly.
Figure 9B:
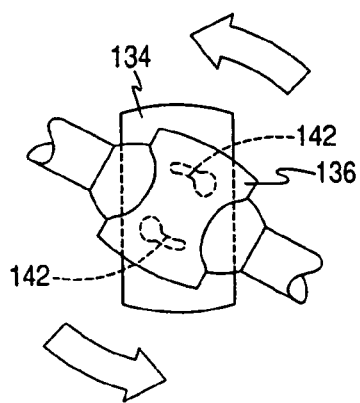
FIG. 9B is a front view of the front wheel mount and the front wheel connector of FIG. 9A in an unlock position.

FIGS. 9A and 9B illustrate another alternative front wheel mount 134 of a modular chassis and an associated, alternative front wheel connector 136 of a front wheel assembly. This front wheel mount 134 employs a quarter turn locking mechanism to couple the front wheel assembly to the chassis body 12. The front wheel connector 136 includes a pair of tabs 138 that have enlarged ends 140. The front wheel mount 134 includes a pair of curved slots 142 that correspond to the location of the tabs 138 on front wheel connector 136. To couple the front wheel connector 136 to the front wheel mount 134, the tabs 138 are inserted into enlarged ends 144 of the curved slots 142, as shown in FIG. 9B. The front wheel connector 136 (and front wheel axle) is then rotated, in FIG. 9B counterclockwise, until the tabs 138 reach the narrowed ends 146 of the slots 142. To decouple the front wheel connector 136 from the front wheel mount 134, the front wheel connector 136 is rotated, in FIG. 9B clockwise, until the tabs 138 reach the enlarged ends 144 of the slots 142. The tabs 138 of the front wheel connector 136 then can be removed from the slots 142. The slots 142 thus are configured to allow movement of the tabs 138 along the slots 142 between a lock position (tab 138 at narrowed end 146) and an unlock position (tab 138 at enlarged end 144).

Figure 10A:
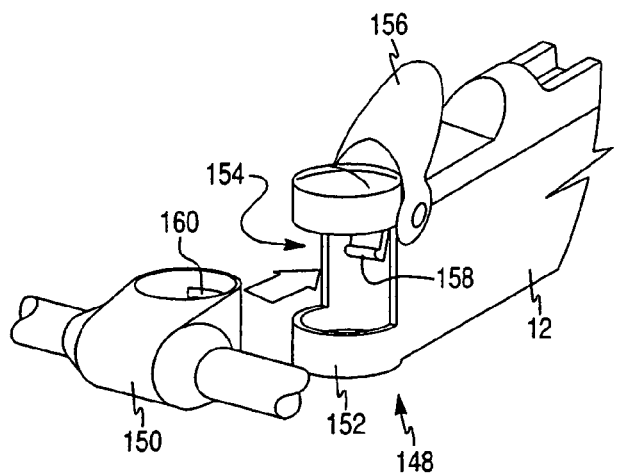
FIG. 10A is an exploded perspective view of another alternative front wheel mount of the modular chassis and an associated, alternative front wheel connector of the front wheel assembly.
Figure 10B:
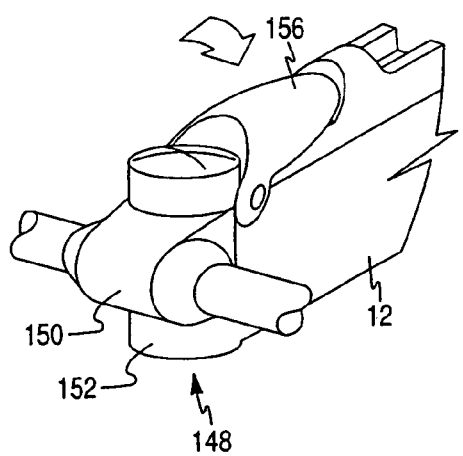
FIG. 10B is a perspective view of the front wheel mount and the front wheel connector of FIG. 10A in a lock position.

FIGS. 10A and 10B illustrate another alternative front wheel mount 148 of a modular chassis and an associated, alternative front wheel connector 150 of a front wheel assembly. This front wheel mount 148 employs a cam lock system, similar to the embodiment of FIGS. 7A-7C. In this embodiment, the front wheel mount 148 includes a housing 152 having a cavity 154 to receive the front wheel connector 150. The front wheel mount 148 also includes a lever 156 movably mounted to the housing 152 and a cam 158 mounted to the lever 156 and extending into the cavity 154. The cam 158 is shaped to engage a slot 160 in the front wheel connector 150. To couple the front wheel connector 150 to the front wheel mount 148, the slot 160 of the front wheel connector 150 can be aligned with and engaged by the cam 158, and then the lever 156 can be rotated from its unlock position, as shown in FIG. 10A, to its lock position, as shown in FIG. 10B. As the lever 156 rotates, the cam 158 draws the front wheel connector 150 into the cavity 154. To decouple the front wheel connector 150 from the front wheel mount 148, the lever 156 can be lifted, which causes the cam 158 to disengage from slot 160. The front wheel assembly then can be removed and interchanged for another front wheel assembly.

Figure 11A:
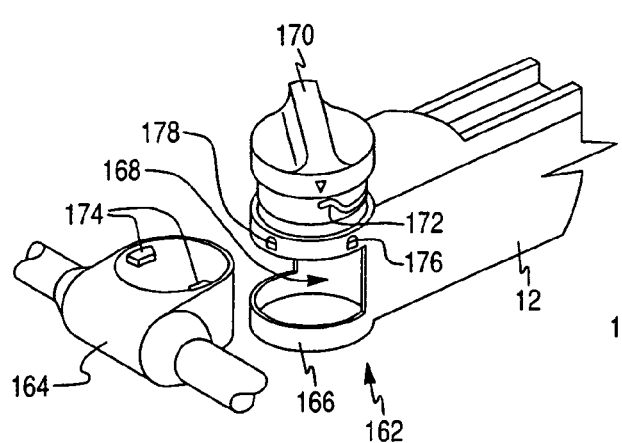
FIG. 11A is an exploded perspective view of another alternative front wheel mount of the modular chassis and an associated, alternative front wheel connector of the front wheel assembly.
Figure 11B:
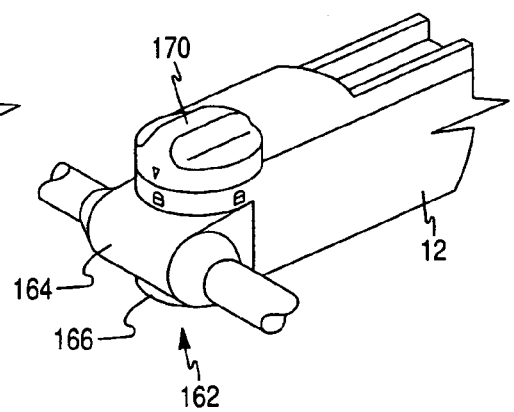
FIG. 11B is a perspective view of the front wheel mount and the front wheel connector of FIG. 11A in a lock position.

FIGS. 11A and 11B illustrate another alternative front wheel mount 162 of a modular chassis and an associated, alternative front wheel connector 164 of a front wheel assembly. This front wheel connector 164 is coupled to the front wheel mount 162 by a turn screw system. The front wheel mount 162 includes a housing 166 having a cavity 168, which is formed to receive the front wheel connector 164, and a screw 170. The screw 170 is rotatably mounted to the housing 166 to rotate between a lock position, shown in FIG. 11B, and an unlock position. The screw 170 includes a slot 172 (or slots) to receive a corresponding tab 174 (or tabs) on the front wheel connector 164. The housing 166 can include indicators 176, 178 to visually cue the lock and unlock position, respectively. To couple the front wheel connector 164 to the front wheel mount 162, the front wheel connector 164 is inserted into the cavity 168, the screw 170 is mounted to the housing 166 such that the slot 172 aligns with the tab 174, and the screw 170 is rotated from the unlock position to the lock position. To decouple the front wheel connector 164 from the front wheel mount 162, the screw 170 is rotated in the reverse direction, from the lock position to the unlock position. The screw 170 then can be lifted off the housing 166, and the front wheel connector 164 can be removed from the cavity 168. Any of the above front wheel mount embodiments of FIGS. 7A-7C, 8A-8B, 9A-9B, 10A-10B, and 11A-11B can be employed on a modular chassis according to the invention.

Figure 3A:
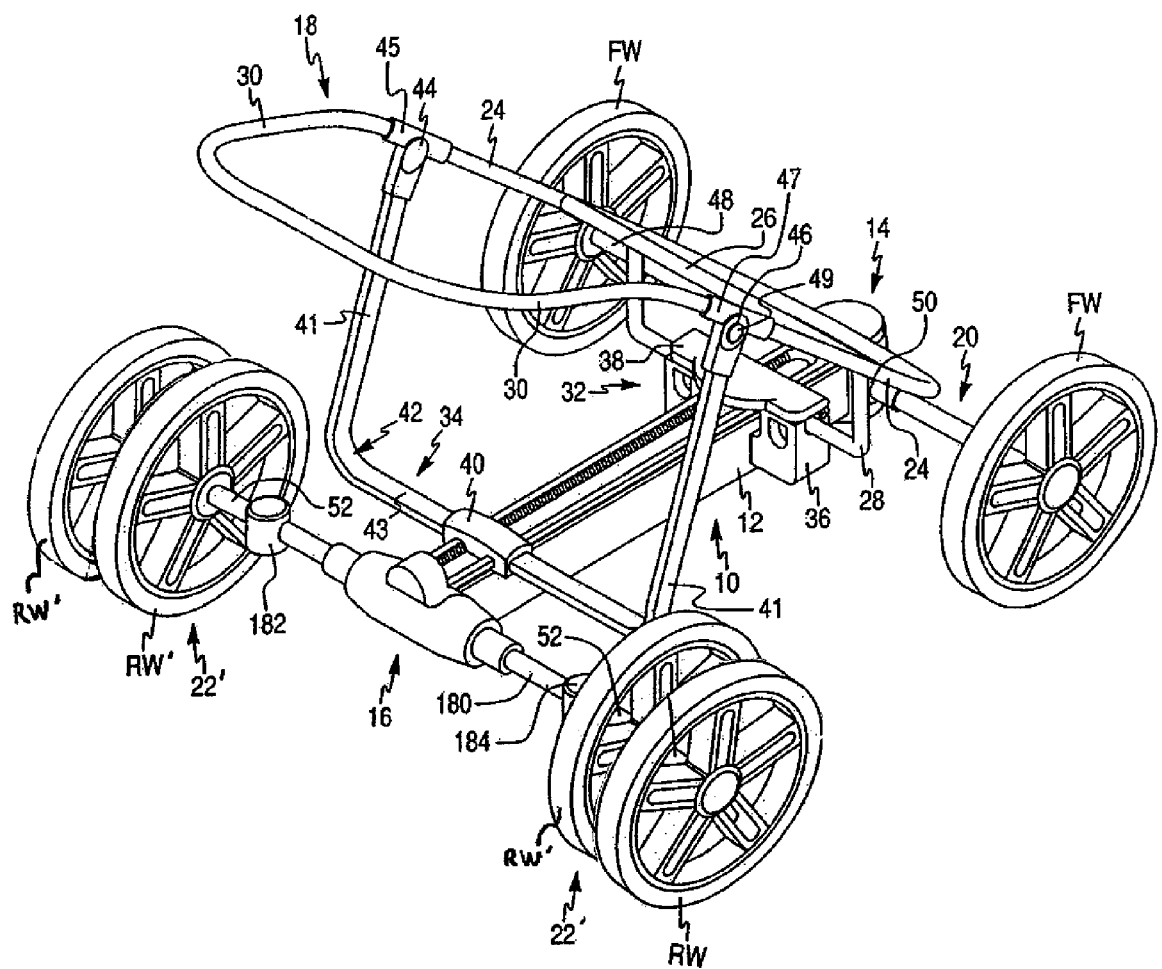
FIG. 3A is a rear perspective view of FIG. 2, but showing an alternative rear wheel assembly.

Focusing now on the rear end of the modular chassis 10, the modular chassis 10 employs a rear wheel mount 16 to enable various rear wheel assemblies to coupled to and decoupled from the chassis body 12. The rear wheel mount 16, as shown in FIG. 1, can include a rear wheel axle 180, a first wheel connector 182 at a first end of the axle 180, and a second wheel connector 184 at a second end of the axle 180. The rear wheel axle 180 and rear wheel connectors 182, 184 are fixed relative to the chassis body 12. A rear wheel assembly, which includes a pair of rear wheels RW, RW in the embodiment of FIGS. 2-3, can be coupled to the first and second wheel connectors 182, 184. In an alternative embodiment, a two-wheel arrangement can be coupled to each rear wheel connector 182, 184 to provide four wheels RW' on rear wheel assemblies 22' at the rear of the stroller, as shown in FIG. 3A. Swivels can be disposed between the rear wheels RW and the connectors 182, 184 to allow rotation of the rear wheels RW relative to the rear wheel mount 16.

The front and rear wheel mounts 14, 16 can provide three wheel, four wheel, and six wheel stroller platforms. Further, the front and rear wheel mounts 14, 16 can receive wheel assemblies for different terrains, environments, and indoor-outdoor usage.

In addition to front and rear wheel mounts 14, 16, first and second stroller frame mounts 32, 34 are mounted to the chassis body 12. The first stroller frame mount 32 is located closer to the front end 74 of the chassis body 12, and the second stroller frame mount 34 is located closer to the rear end 76 of the chassis body 12. Examples of first and second stroller frame mounts 32, 34 now will be described in connection with FIGS. 12A-12D and 13.

Figure 12A:
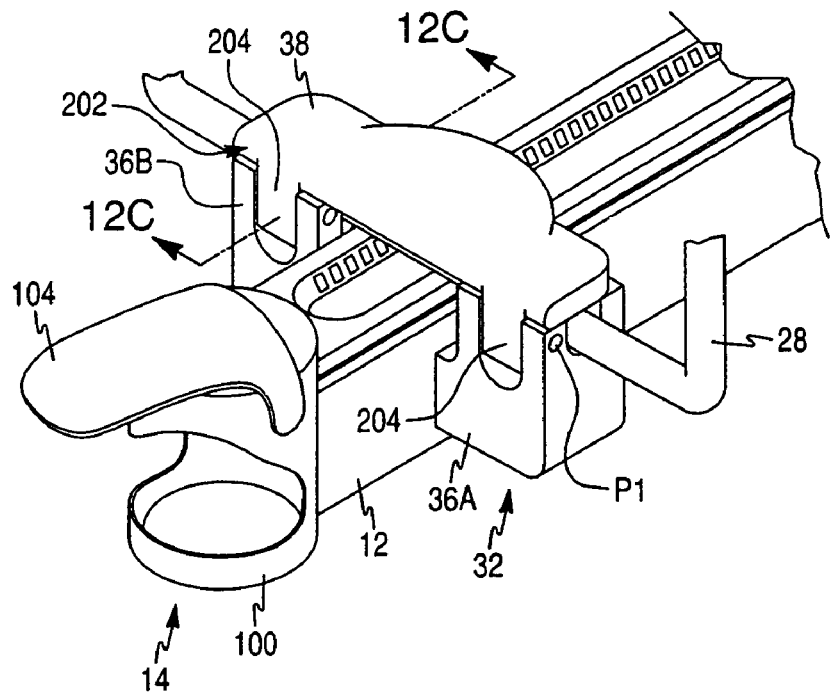
FIG. 12A is a perspective view of a first stroller frame mount of the modular chassis of FIG. 1 in a closed position.
Figure 12B:
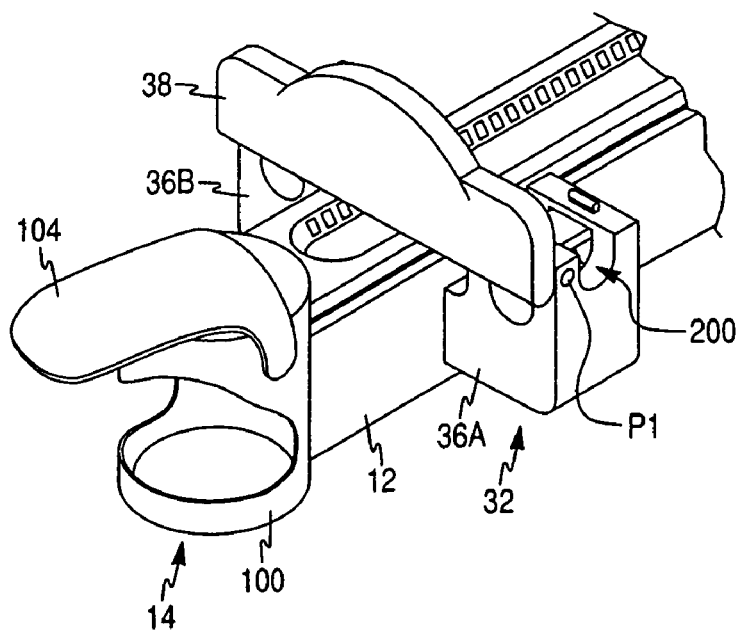
FIG. 12B is a perspective view of the first stroller frame mount of FIG. 12A in an open position.
Figure 12C:
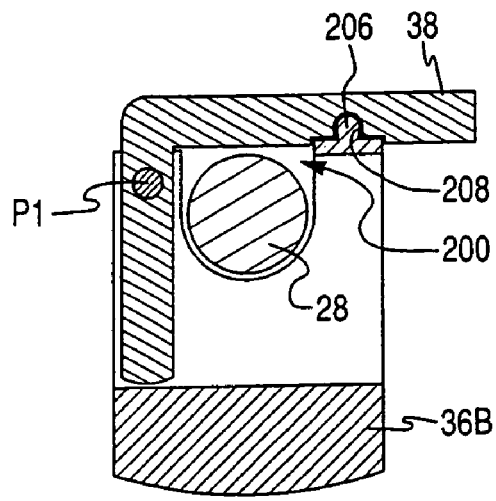
FIGS. 12C-12D are cross section views of the first stroller frame mount in the closed position and the open position, respectively.
Figure 12D:
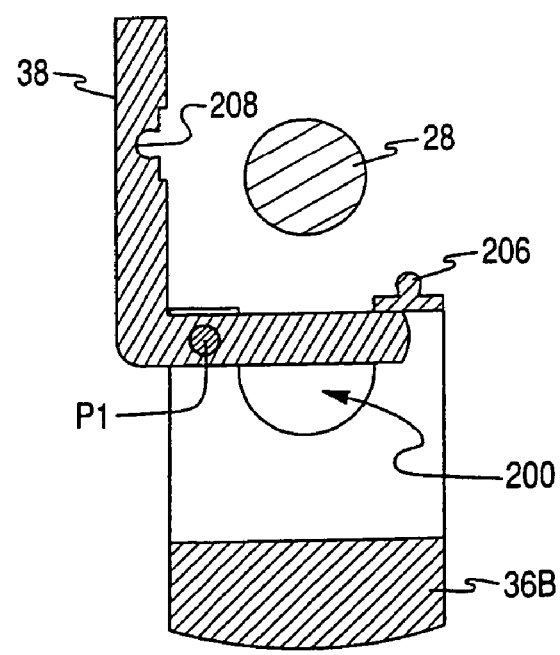

FIGS. 12A-12D show how a stroller frame configuration can be coupled to, and decoupled from, the first stroller frame mount 32 of the modular chassis 10. The first stroller frame mount 32 includes a bracket 36 fixedly mounted to the chassis body 12, for example, to side surfaces of the chassis body 12, as shown in FIGS. 12A and 12B. The bracket 36 can comprise a pair of similarly-shaped bracket structures 36A, 36B, one structure mounted to each side surface of the body 12, as shown in FIG. 12A. The first stroller frame mount 32 also includes a bracket cover 38 pivotally attached to the bracket 36A, 36B at a pivot P1 to move between an open position (see FIG. 12B) and a closed position (see FIG. 12A). The bracket cover 38 extends over the chassis body 12. The bracket 36A, 36B is configured to receive a frame member, such as locking bar 28, of a stroller frame configuration to couple securely the stroller frame configuration to the chassis body 12. The bracket 36A, 36B can include a channel 200 formed to receive the locking bar 28, which is a tubular U-shaped frame member located at a front end of the stroller frame configuration in the embodiment of FIG. 2. When the bracket 36A, 36B receives the locking bar 28 and the bracket cover 28 is in the closed position, the bracket 36A, 36B and bracket cover 38 couple the stroller frame configuration to the chassis body 12, as shown in FIGS. 12A and 12C. To decouple the stroller frame configuration, the bracket cover 38 can be pivoted to the open position, as shown in FIGS. 12B and 12D, and the locking bar 28 can be lifted out of the bracket channel 200. To facilitate decoupling of the locking bar 28 from the bracket 36A, 36B, the rear edge 202 of the bracket cover 38 can include extensions 204 that lift the locking bar 28 out of the channel 200 as the bracket cover 38 is pivoted from the closed position to the open position, as shown in FIGS. 12C and 12D.

As can best be seen in FIGS. 12C and 12D, the bracket 36A, 36B and the bracket cover 38 can include a snap arrangement to secure the bracket cover 38 in the closed position. The snap arrangement can comprise a button 206 formed on the bracket 36A, 36B and a recess 208 formed in the bracket cover 38. Alternatively, the button can be formed on the bracket cover and the recess can be formed in the bracket. It will be understood that the first stroller frame mount 32 can employ other suitable fastening arrangements to secure the bracket cover to the bracket. The bracket 36A, 36B and the bracket cover 38 of the first stroller frame mount 32 provide a first coupling mechanism to couple releasably a stroller frame configuration to the modular chassis 10.

Figure 13:
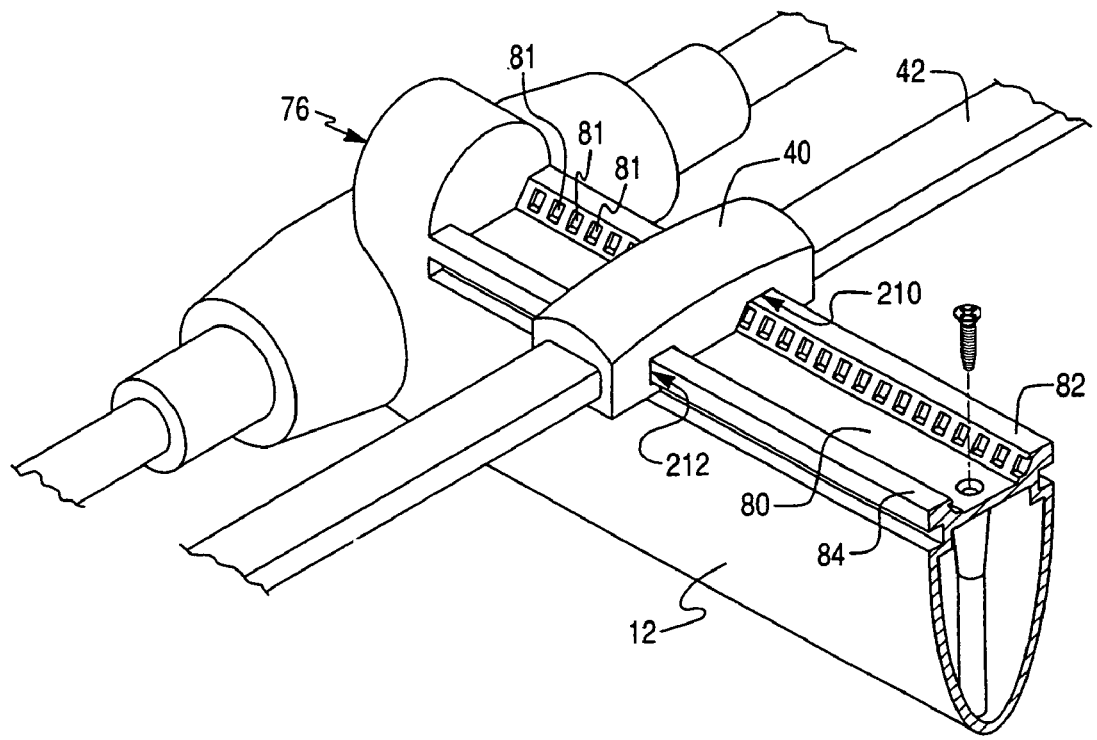
FIG. 13 is a perspective view of a second stroller frame mount of the modular chassis of FIG. 1.

The second stroller frame mount 34 provides a second coupling mechanism to couple releasably a stroller frame configuration to the modular chassis 10. Referring to FIGS. 1 and 13, the second stroller frame mount 34 can include a shuttle 40 slidably mounted to track 80, a tube 42 having a first end, a second end, and an intermediate portion mounted to the shuttle 40, and first and second latches 44, 46. The tube 42 can be generally U-shaped, and, in one embodiment, as shown in FIG. 2, the tube 42 can include legs 41 and a cross member 43 that connects to the shuttle 40. The first and second latches 44, 46 can be disposed at the respective first and second ends of the U-shaped tube 42, for example, at the respective upper ends of legs 41. The first and second latches 44, 46 are configured to couple releasably and interchangeably different stroller frame configurations to the modular chassis 10.

Figure 27:
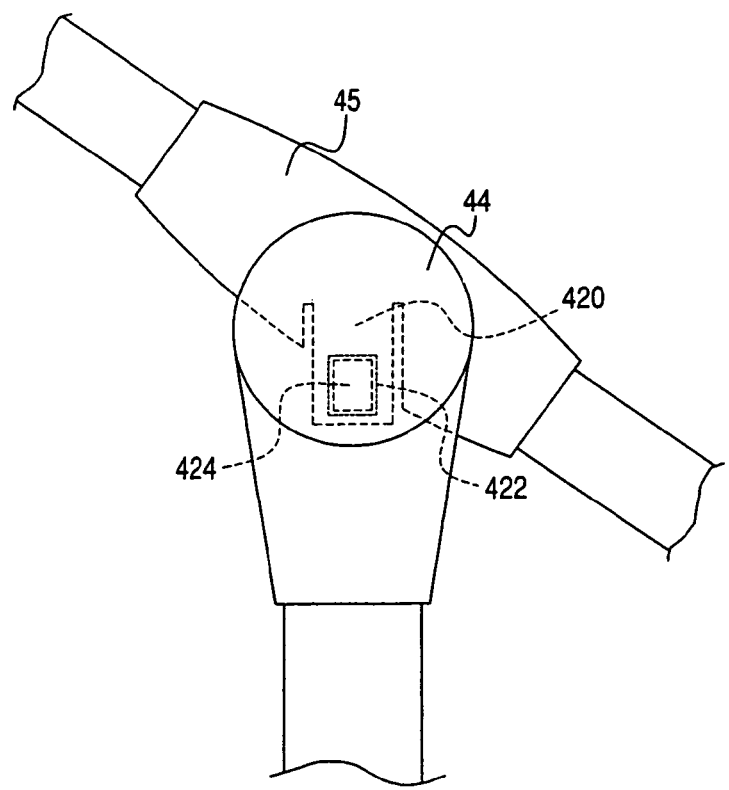
FIG. 27 is an enlarged side view of the latch member of a second stroller frame mount of FIG. 1 and a corresponding latch member of a stroller frame configuration, illustrating engagement of the latch members.

As mentioned above, the first and second latches 44, 46 each can include an actuator button 49 that can be depressed to release the frame latches 45, 47 from the respective chassis latches 44, 46. FIG. 27 illustrates how a frame latch 45 of a stroller frame configuration can couple to a chassis latch 44 of the modular chassis 10. The frame latch 45 can include a flexible finger 420 having a hole 422, and the chassis latch 44 can have a tab 424 that is sized to be received in the hole 422. To couple the stroller frame configuration to the chassis, the frame latch 45 can be positioned above the chassis latch 44 and then lowered onto the chassis latch 44. The finger 420 can flex past the tab 424 until the tab 424 aligns with the hole 422. The finger 420 then latches to the tab 424. To decouple the stroller frame configuration from the chassis, the actuator button 49 (see FIG. 1) can be depressed, so that the button 49 contacts the finger 420 to flex it away from the tab 424. Once the hole 422 of the finger 420 clears the tab 424, the frame latch 45 (and stroller frame configuration) can be lifted off of the chassis latch 44 (and modular chassis). Chassis latch 46 and frame latch 47 can operate in the same manner to couple releasably the stroller frame configuration to the modular chassis 10.

Figure 28:
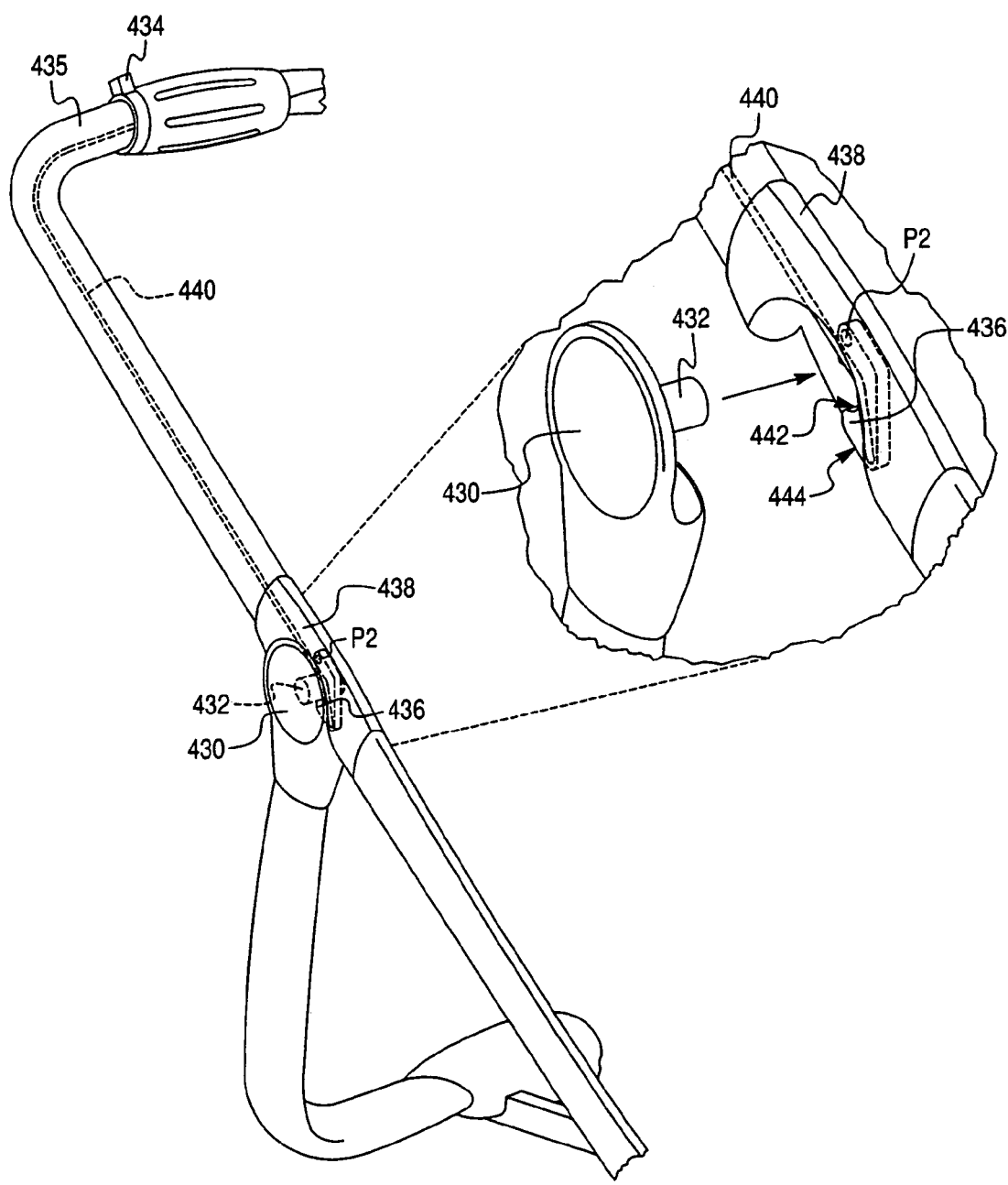
FIG. 28 is a perspective view of another embodiment of a latch member of a second stroller frame mount and a corresponding latch member of a stroller frame configuration.
Figure 28A:
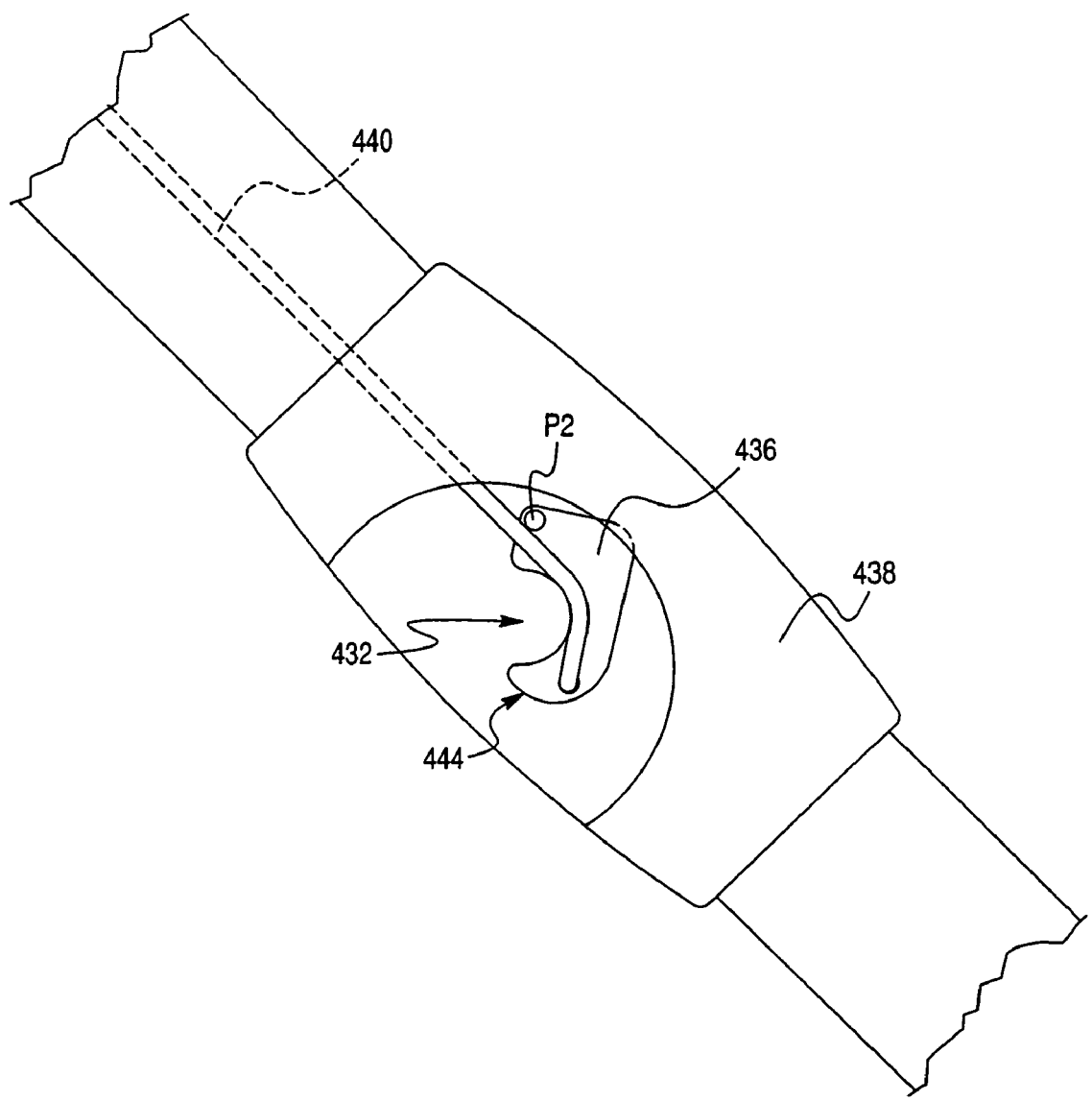
FIG. 28A is a side view of the latch member of the stroller frame configuration of FIG. 28.

Additionally, other frame latch/chassis latch arrangements are envisioned. One such alternative arrangement is illustrated in FIGS. 28 and 28A. FIG. 28 illustrates a modular chassis that includes a latch 430 having a lock pin 432. This type of latch 430 can be used to couple a stroller frame configuration equipped with a release lever 434 on handle 435, a frame latch 438 and associated structure, and a cable 440 extending between the release lever 434 and the frame latch 438. The frame latch 438 includes a locking plate 436 that is connected to the cable 440 and that is pivoted to a wall of the frame latch 434 at pivot P2. The locking plate 436 has a cut-out 442 sized to receive the lock pin 432 and a contoured surface 444. To couple the stroller frame configuration to the modular chassis, the frame latch 438 is moved toward the latch 430. As contoured surface 444 contacts the lock pin 432, the contoured surface 444 causes the locking plate 436 to rotate away from the lock pin 432 about pivot P2. Once cut-out 442 reaches lock pin 432, a torsion spring (not shown) at pivot P2 causes the locking plate to snap back to its rest state, capturing lock pin 432 in cut-out 442. Engagement of lock pin 432 in cut-out 442 couples the stroller frame configuration to the modular chassis. To decouple the stroller frame configuration from the modular chassis, the release lever 434 can be actuated, which draws the cable 440 toward the handle 435. This movement of the cable 440 causes the locking plate 436 again to rotate away from the lock pin 432 about pivot P2. Once lock pin 432 clears the cut-out 442, the frame latch 438 (and stroller frame configuration) can be lifted off of the chassis latch 430 (and modular chassis).

A stroller frame configuration thus can be coupled releasably to the modular chassis 10 by a first stroller frame mount, such stroller frame mount 32 employing bracket and bracket cover 36, 38, and by a second stroller frame mount, such as stroller frame mount 34 employing chassis latches 44, 46. In an alternative embodiment, the second stroller frame mount 34 can include simply a shuttle (like shuttle 40) and a shuttle cover, movably mounted to the shuttle and formed similarly to bracket cover 38. In this alternative embodiment, a stroller frame configuration could include a frame member to be received between the shuttle and the shuttle cover, and that stroller frame configuration could be coupled to the modular chassis by the bracket/bracket cover and the shuttle/shuttle cover.

As mentioned above, the second stroller frame mount 34 can be slidably mounted to the chassis body 12. The second stroller frame mount 34 can move between an in-use position and a fold position so that a stroller frame configuration coupled to the second stroller frame mount 34 can fold relative to the modular chassis 10.

To facilitate sliding movement of the second stroller frame mount 34 along the chassis body 12, the chassis body 12 has a longitudinal track 80 formed on its upper surface 78. The track 80 can have a pair of opposed, upstanding walls 82, 84, and the shuttle 40 of the second stroller frame mount 34 can include corresponding channeled recesses 210, 212 to mate with the walls 82, 84, as shown best in FIG. 13. The shuttle 40 also can include a rolling or bearing system to ease movement along track 80. The track 80 can include a series of teeth 81 to control movement of the shuttle 40, as illustrated, or the track 80 can include a single detent that locks the shuttle 40 in the in-use position at a rear end of the chassis body 12. The chassis body 12 can include an internal mechanism that is cable-actuated to engage the shuttle 40 and lock it at a desired location on the track 80.

Figure 14:
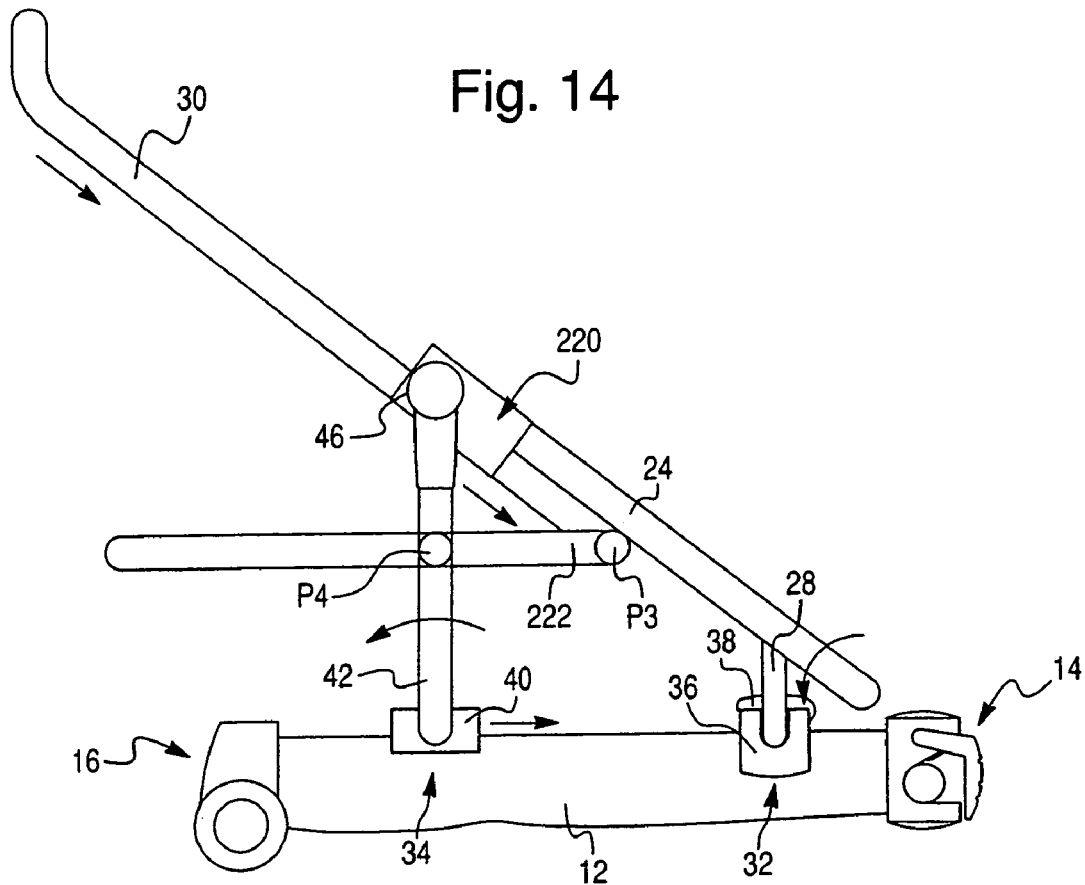
FIG. 14 is a schematic side view of the modular chassis and a first frame configuration in an in-use position.
Figure 15:
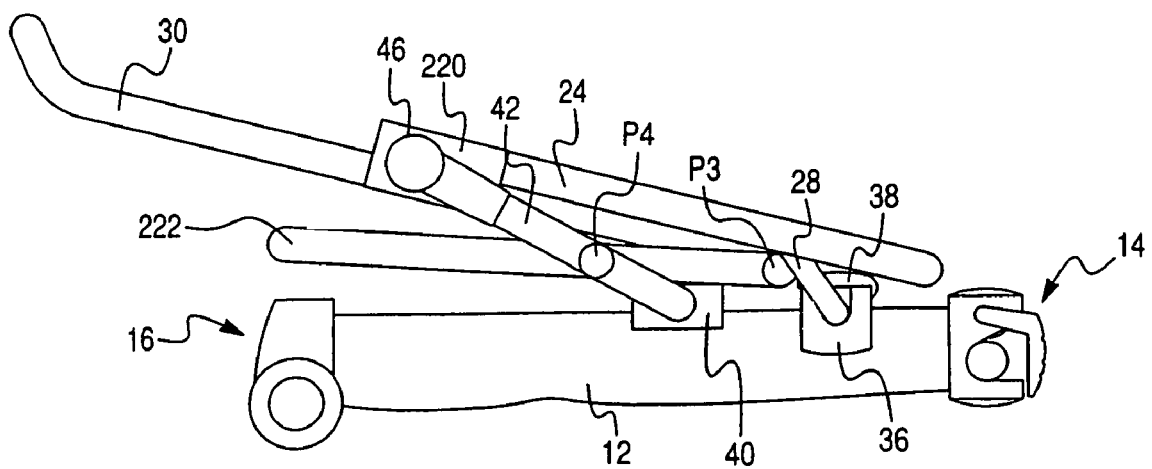
FIG. 15 is a schematic side view of the modular chassis and a first frame configuration in a fold position.

FIGS. 14-15 illustrate folding of an embodiment of a stroller that utilizes a modular chassis 10 in accordance with the invention. In this embodiment, each side of the stroller frame configuration includes a front leg 24 pivotally connected to a slider bracket 220, a locking bar 28, a push arm 30 slidably connected to the slider bracket 220, and a basket frame member 222 pivotally connected to the push arm 30 at pivot P3 and pivotally connected to an upwardly extending leg of tube 42 at pivot P4. The basket frame member 222 can comprise a U-shaped tube and can serve as a support for the child seating area of the stroller. The modular chassis 10 includes body 12, front wheel mount 14, rear wheel mount 16, first stroller frame mount 32 to which the locking bar 28 is coupled, and second stroller frame mount 34, which includes shuttle 40, tube 42, and latches 44 (not shown), 46. The latches 44, 46 are pivotally connected to the respective slider brackets 220 on either side of the stroller frame configuration. In addition, the slider brackets 220 can include frame latches, such as latches 45, 47, to couple releasably to chassis latches 44, 46, respectively.

FIG. 14 shows the stroller in an in-use position, and FIG. 15 shows the stroller in a fold position. As can be seen, the shuttle 40 slides from the front of the chassis body 12 to the rear during an unfolding operation and from the rear of the chassis body 12 to the front during a folding operation. To fold the stroller, push arm 30 can be pushed downwardly and forwardly, toward the front end of the chassis body 12. The push arm 30 can slide forward relative to the slider bracket 220. At the same time, the shuttle 40 can slide toward a front end of the chassis body 12 along track 80. The forward movement of the shuttle 40 causes the upwardly extending leg of the tube 42 to rotate rearwardly and downwardly, which, in combination with movement of the push arm 30, draws the basket frame member 220 downwardly, toward the chassis body 12. The front leg 24 of the stroller frame configuration rotates rearwardly as the slider bracket 220 is drawn downwardly by the tube 42 toward the chassis body 12. To open the stroller to the in-use position, the push arm 30 can be pulled rearwardly and upwardly, which ultimately causes the shuttle 40 to move toward the rear end of the chassis body 12.

To facilitate unfolding of the stroller, the modular chassis 10 can include an unfold assist mechanism connected to the shuttle 40. The unfold assist mechanism is designed to provide an external force on the shuttle 40 that urges movement of the shuttle 40 from its fold position to its in-use position. Examples of such unfold assist mechanisms now will be described in connection with FIGS. 16A-16B, 17, and 18A-18B.

Figure 16A:
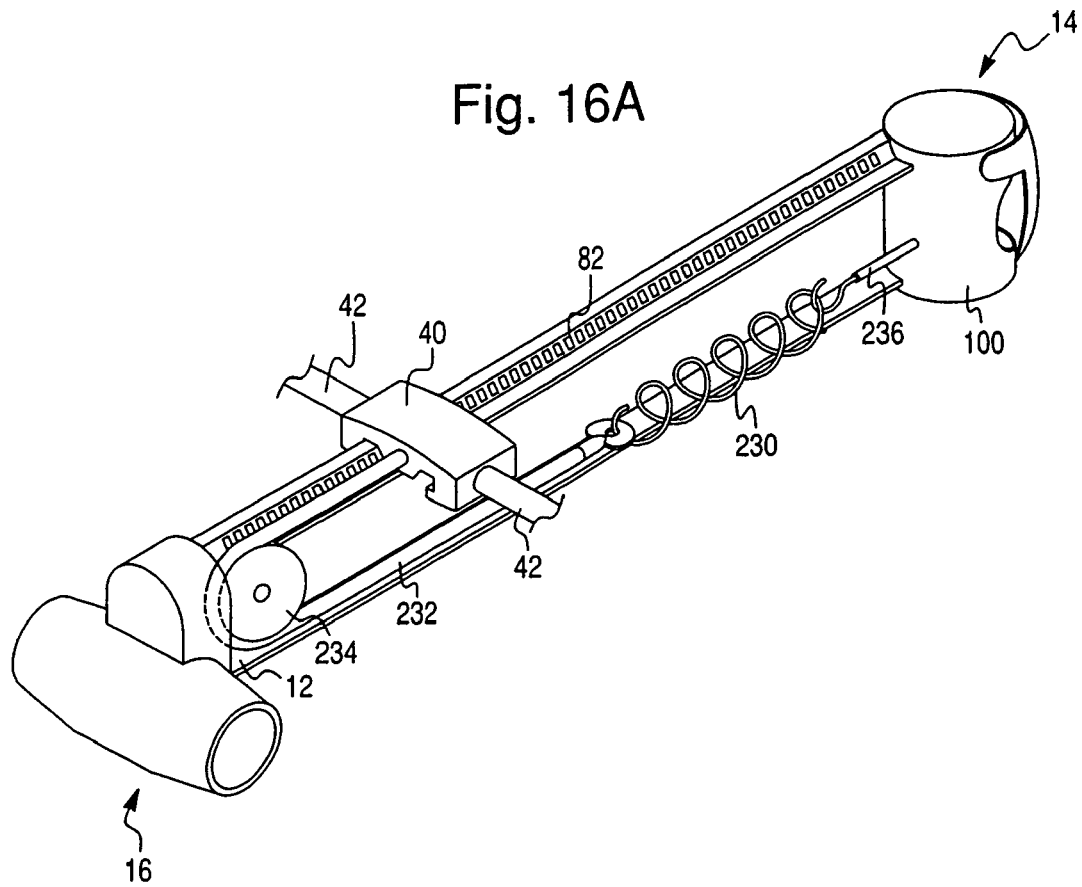
FIG. 16A is a rear perspective view of a modular chassis with a tension spring unfold assist mechanism.
Figure 16B:
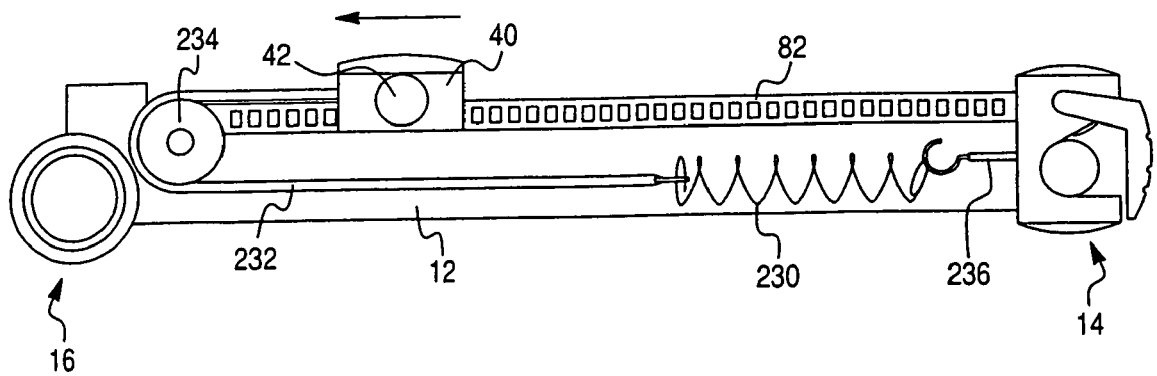
FIG. 16B is a cut away side view of the modular chassis of FIG. 16A.

FIGS. 16A-16B illustrate an embodiment of the modular chassis 10 that includes a tension spring unfold assist mechanism. The tension spring unfold assist mechanism can have a tension spring 230, a cable 232, and a pulley 234. One end of the tension spring 230 can be fixedly secured to the chassis body 12 or, as illustrated, to the housing 100 of the front wheel mount 14 by a hook fastener 236. The free end of the tension spring 230 can be secured to the shuttle 40 via cable 232. The cable 232 passes around the pulley 234, which is rotatably mounted to the chassis body 12 near or to a rear end of the chassis body 12. The tension spring 230 (based on position and spring rate) applies a rearward force on the shuttle 40 to pull the shuttle 40 toward the rear end of the chassis body 12.

Figure 17:
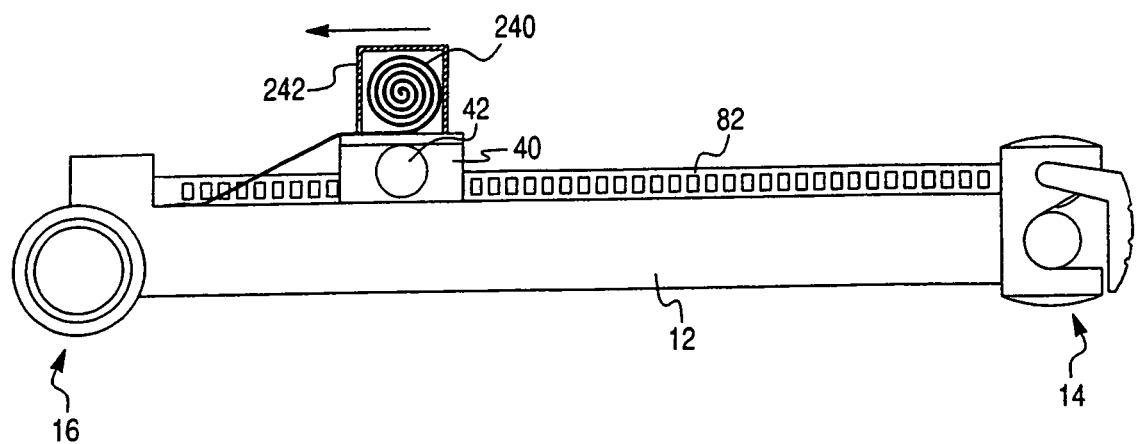
FIG. 17 is a cut-away side view of a modular chassis with a constant force spring unfold assist mechanism.

FIG. 17 illustrates another embodiment of the modular chassis 10 that includes a constant force spring unfold assist mechanism. This unfold assist mechanism includes a constant force spring 240 that is wound into a coil at one end and retained in a spring housing 242 mounted to the shuttle 40. The free end of the constant force spring 240 is fixedly attached near or to a rear end of the chassis body 12. As the shuttle 40 moves forward, the spring 240 unwinds. The unwound portion of the spring 240 can lie on the top surface of the chassis body 12. The spring 240 applies a constant rearward force on the shuttle 40, so that the shuttle 40 is pulled toward the rear end of the chassis body 12 by the spring 240.

Figure 18A:
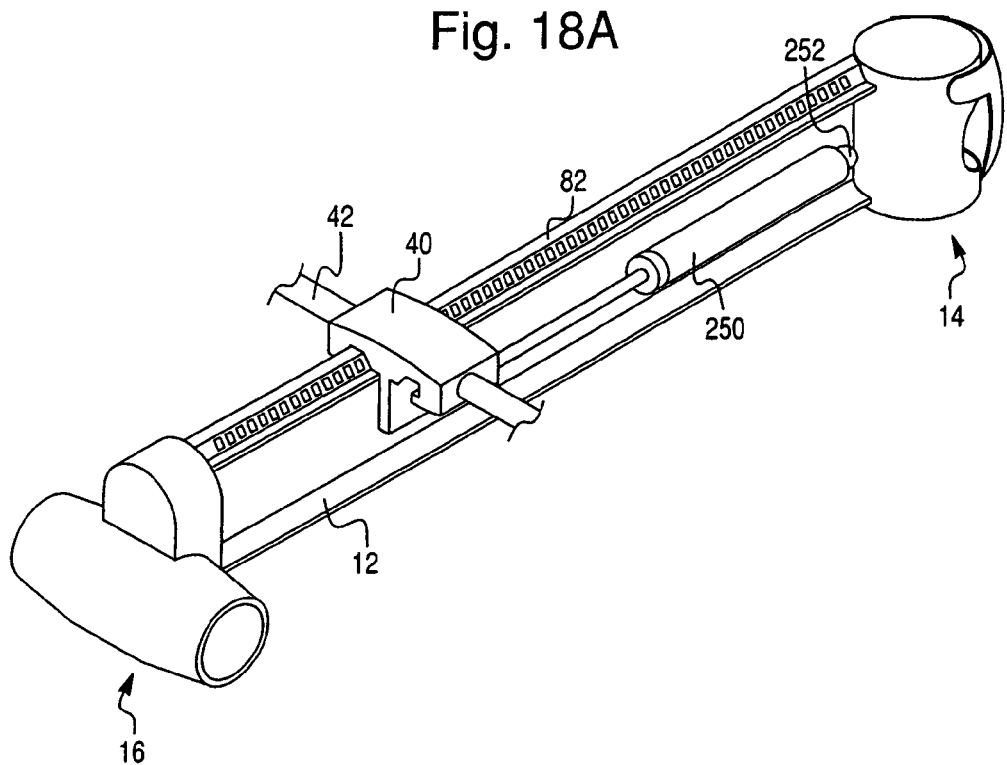
FIG. 18A is a rear perspective view of a modular chassis with a gas-charged cylinder unfold assist mechanism.
Figure 18B:
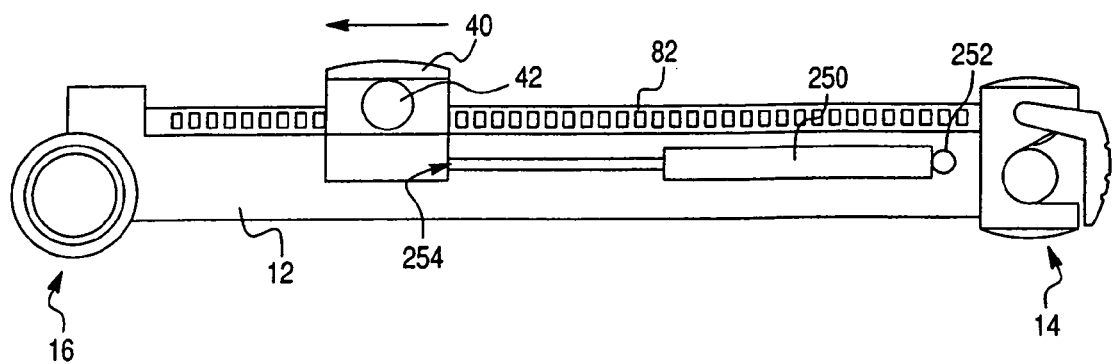
FIG. 18B is a cut-away side view of the modular chassis of FIG. 18A.

FIGS. 18A and 18B illustrate another embodiment of the modular chassis 10 that includes a gas-charged cylinder unfold assist mechanism. This unfold assist mechanism includes a gas-charged cylinder 250 fixed at one end to the chassis body 12 at or near its front end. The free end 254 of the gas-charged cylinder 250 is connected to the shuttle 40. The gas-charged cylinder 150 applies a linear rearward force to the shuttle 40, so that the shuttle 40 is pulled toward the rear end of the chassis body 12 by the cylinder 250.

To facilitate folding of the stroller, the modular chassis 10 can include a fold assist mechanism connected to the shuttle 40. The fold assist mechanism is designed to provide an external force on the shuttle 40 that urges movement of the shuttle 40 from its in-use position to its fold position. Examples of such fold assist mechanisms will not be described in connection with FIGS. 19 and 20A-20B.

Figure 19:
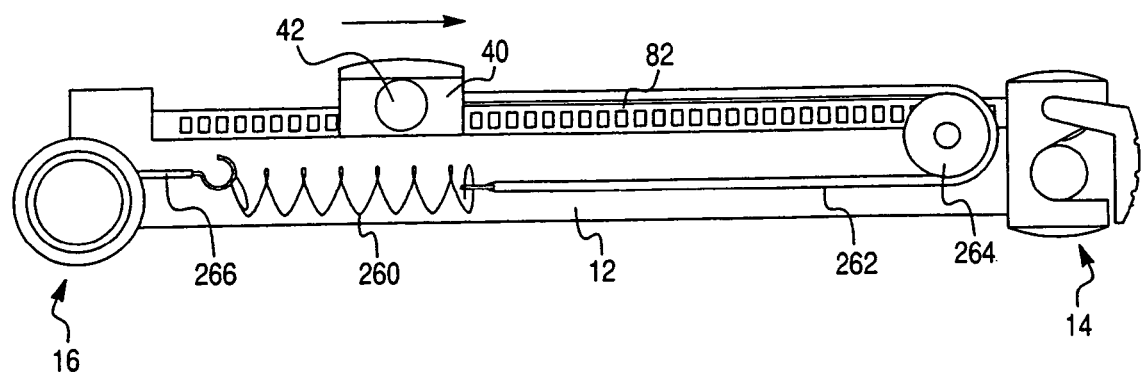
FIG. 19 is a cut-away side view of a modular chassis with a tension spring fold assist mechanism.

FIG. 19 illustrates an embodiment of the modular chassis 10 that includes a tension spring fold assist mechanism. The tension spring fold assist mechanism can have a tension spring 260, a cable 262, and a pulley 264. One end of the tension spring 260 can be fixedly secured to the chassis body 12 or, as illustrated, to the rear wheel mount 16 by a hook fastener 266. The free end of the tension spring 260 can be secured to the shuttle 40 via cable 262. The cable 262 passes around the pulley 264, which is rotatably mounted to the chassis body 12 near or to a front end of the chassis body 12. The tension spring 260 (based on position and spring rate) applies a forward force on the shuttle 40 to pull the shuttle 40 toward the front end of the chassis body 12.

Figure 20A:
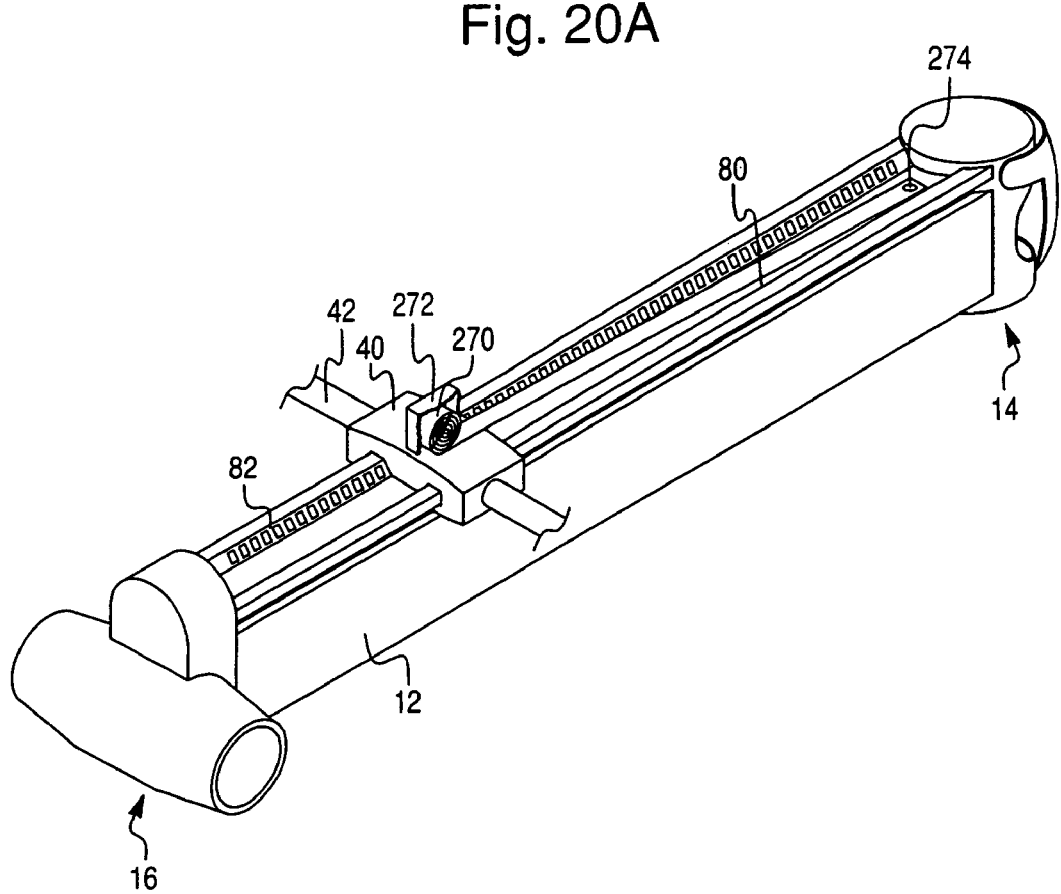
FIG. 20A is a rear perspective view of a modular chassis with a constant force spring fold assist mechanism.
Figure 20B:
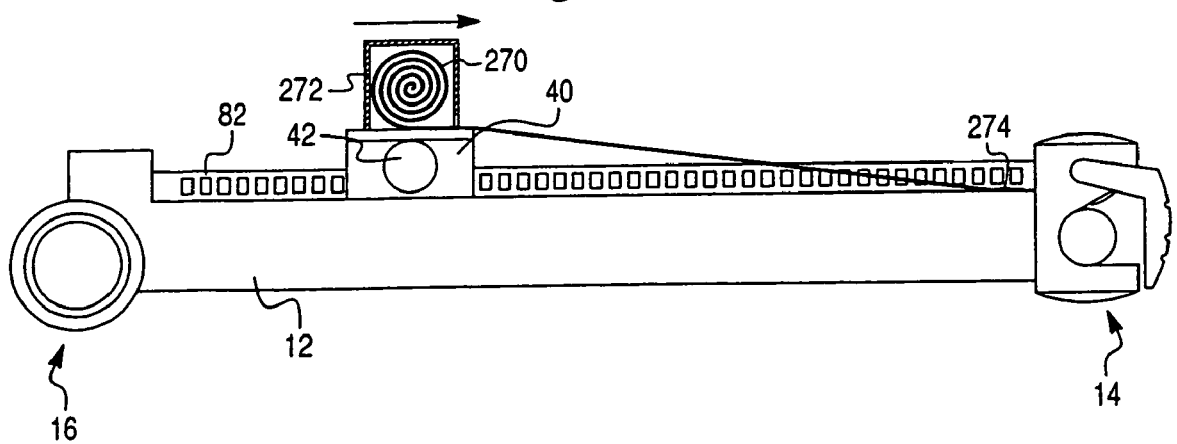
FIG. 20B is a cut away side view of the modular chassis of FIG. 20A.

FIGS. 20A and 20B another embodiment of the modular chassis 10 that includes a constant force spring fold assist mechanism. This fold assist mechanism includes a constant force spring 270 that is wound into a coil at one end and retained in a spring housing 272 mounted to the shuttle 40. The free end 274 of the constant force spring 270 is fixedly attached near or to a front end of the chassis body 12, for example, to track 80. As the shuttle 40 moves rearward, the spring 270 unwinds. The unwound portion of the spring 240 can lie on the top surface of the chassis body 12. The spring 270 applies a constant forward force on the shuttle 40, so that the shuttle 40 is pulled toward the front end of the chassis body 12 by the spring 270.

It will be understood that a gas-charged cylinder arrangement also can be employed on the modular chassis 10 as a fold assist mechanism. Such a gas-charged cylinder fold assist mechanism can include the same general structure as the mechanism of FIGS. 18A and 18B; however, the gas-charged cylinder can be disposed between the shuttle 40 and the rear end of the chassis body 12 to apply a linear forward force on the shuttle 40.

Figure 21A:
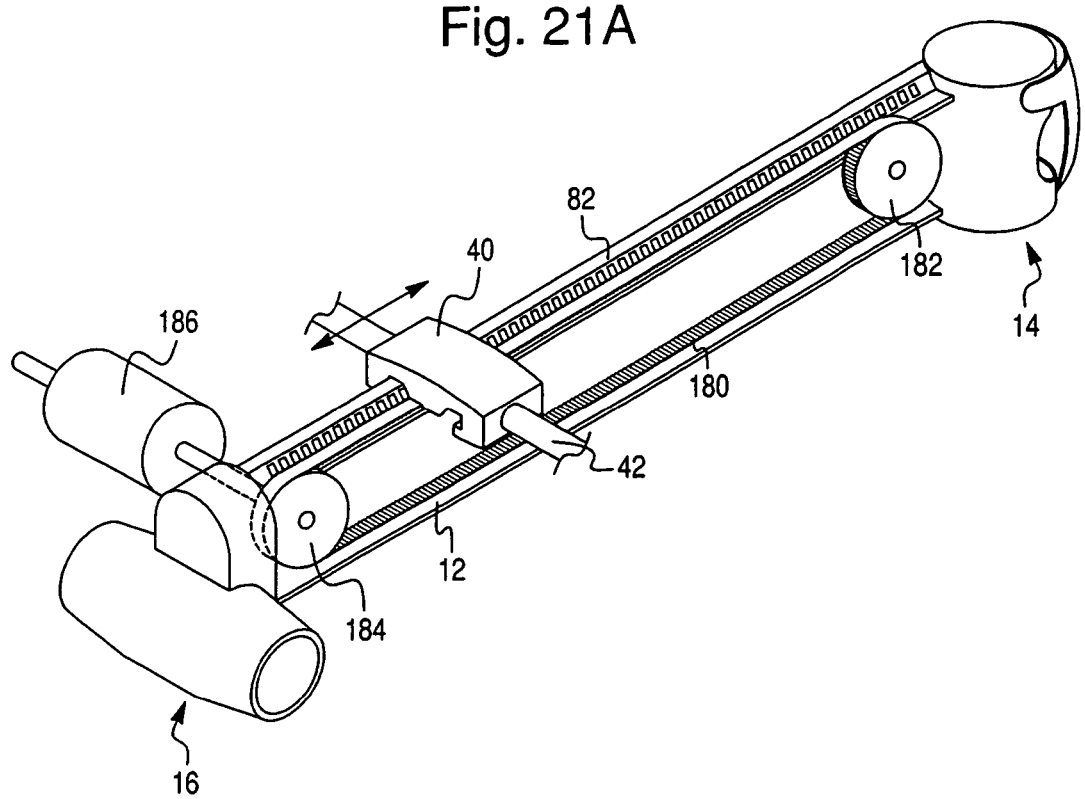
FIG. 21A is a rear perspective view of a modular chassis with a power fold/unfold assist mechanism.
Figure 21B:
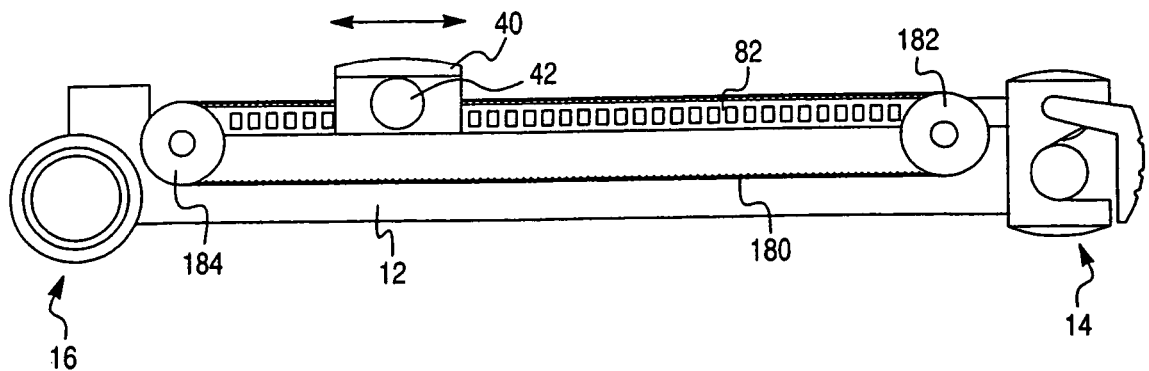
FIG. 21B is a cut away side view of the modular chassis of FIG. 21A.

According to another aspect of the invention, the modular chassis 10 can include a power assist mechanism to drive the shuttle 40 in either a forward direction or a rearward direction, as shown in FIGS. 21A and 21B. The power assist mechanism can include a toothed (timing) belt 180 passed around both an idler pulley 182 near or at one end of the chassis body 12 and a driven pulley 184 near or at the other end of the chassis body 12. The toothed belt 180 connects to the shuttle 40. In the illustrated embodiment, the idler pulley is at the front end of the body 12, and the driven pulley is at the rear end of the body 12. The power assist mechanism also can include an electric motor 186 connected to the driven pulley 184. In this embodiment, the direction of rotation of the motor 186 dictates the direction of travel of the shuttle 40. The power assist mechanism can be an electronic motor assist, as illustrated, a pneumatic assist, or a hydraulic assist.

Figure 22:
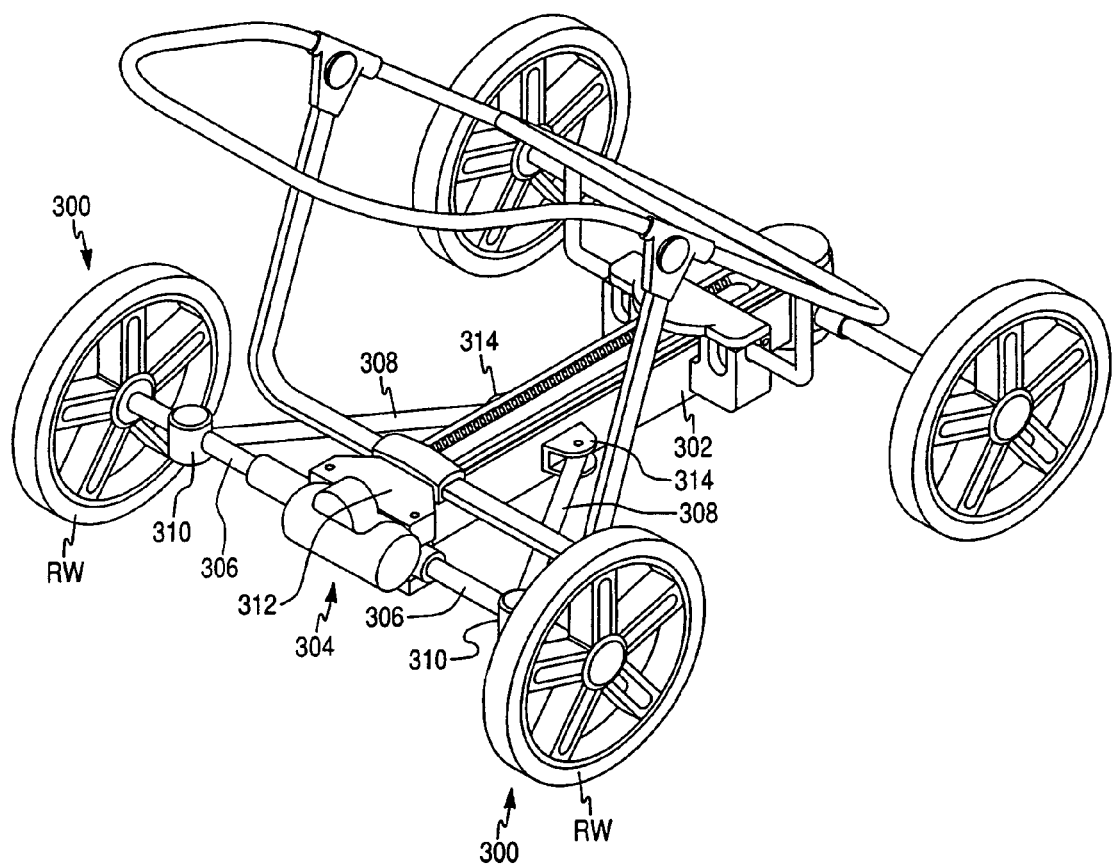
FIG. 22 is a rear perspective view of a stroller that includes another alternative modular chassis adapted to permit folding of a rear wheel assembly coupled to the modular chassis.

As can be understood from FIGS. 22-24, the modular chassis can be designed to enable three-dimensional (3D) folding. This embodiment of the modular chassis can be folded into a smaller package than the embodiment of FIGS. 1-3, for example. To achieve this 3D fold, the rear wheel assembly 300 can be configured to fold inwardly toward the chassis body 302, reducing the width of the stroller.

Figure 24A:
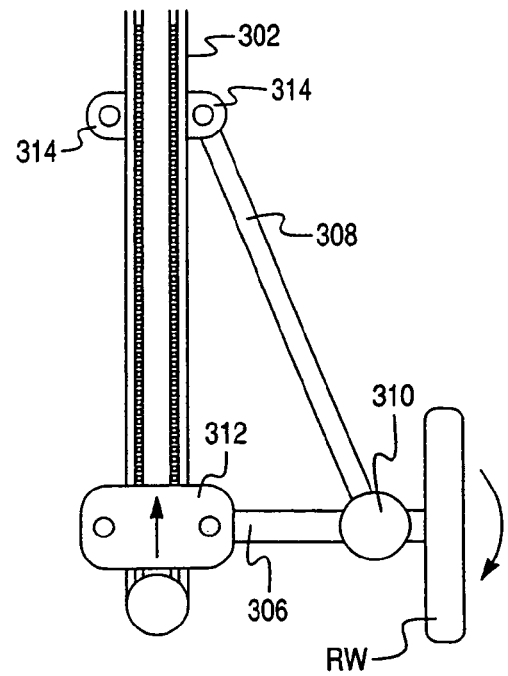
FIGS. 24A and 24B are schematic top views of a modular chassis and a rear wheel assembly according to another embodiment of the invention, illustrating the rear wheel assembly in an in-use position and in a fold position, respectively.
Figure 24B:
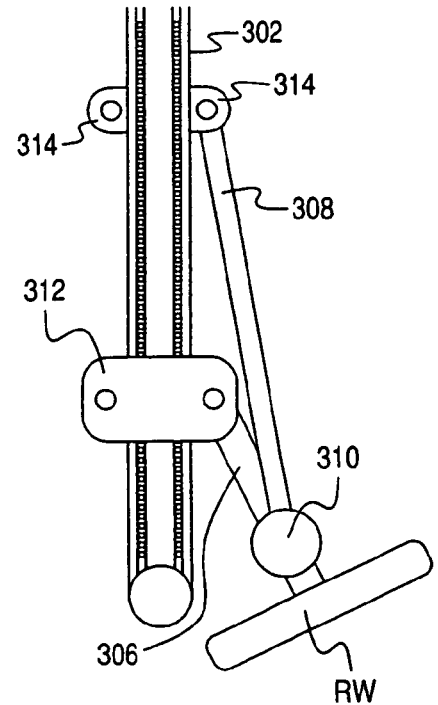

The stroller of this 3D embodiment includes a rear wheel mount 304 that has a pair of rear wheel axles 306, a pair of rear wheel links 308, and rear wheel connectors 310 at the outer ends of the axles 306. Rear wheels RW of the rear wheel assembly 300 can be coupled interchangeably to these rear wheel connectors 310. The second stroller frame mount of this stroller includes a modified shuttle 312 to which the rear axles 306 are pivotally connected. The rear wheel links 308 are connected at one end to the respective rear wheel connector 310 and at the other end to a pivot mount 314 on the chassis body 302. Turning to FIGS. 24A and 24B, as the shuttle 312 slides from the rear end of the chassis body 302 to the front end of the chassis body 302, the rear axles 306 and the rear wheel links 308 pivot to pull the rear wheels RW toward the chassis body 302. FIG. 24A thus shows the rear wheels in an in-use position, and FIG. 24B shows the rear wheels in a fold position. In this embodiment, the rear wheels RW fold to a non-parallel orientation relative to the chassis body 302.

Figure 23A:
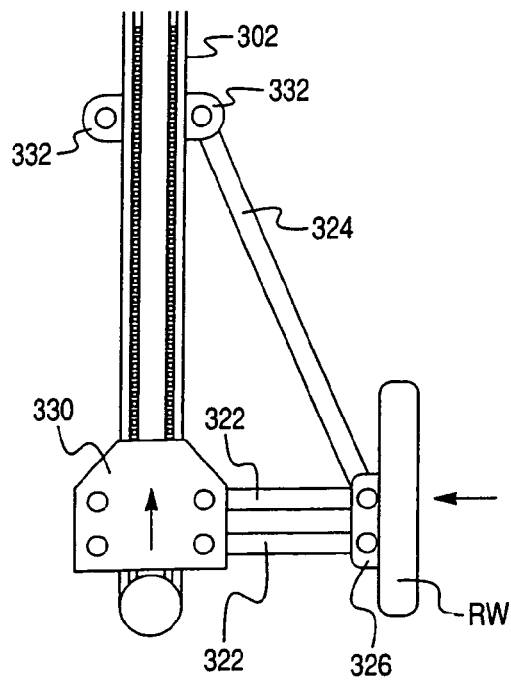
FIGS. 23A and 23B are schematic top views of a modular chassis and a rear wheel assembly according to an embodiment of the invention, illustrating the rear wheel assembly in an in-use position and in a fold position, respectively.
Figure 23B:
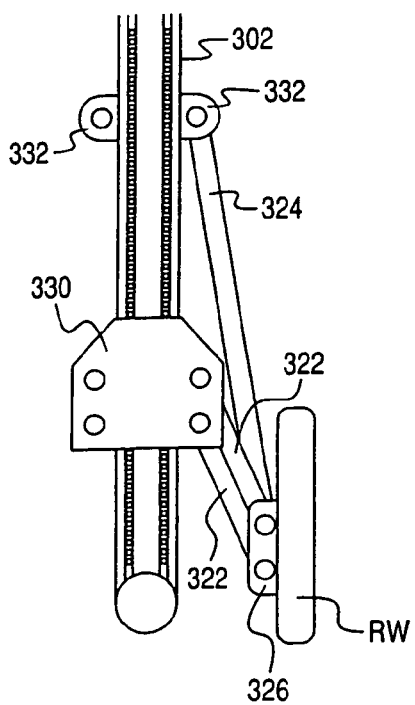

FIGS. 23A and 23B show an alternative embodiment of a stroller having 3D fold capability. In this embodiment, the rear wheels RW fold to a parallel orientation relative to the chassis body 302. The rear wheel mount 320 of this embodiment has a set of rear wheel axles 322 on either side of the chassis body 302, a pair of rear wheel links 324, and rear wheel connectors 326 at the outer ends of the axles 322. Rear wheels RW of the rear wheel assembly can be coupled interchangeably to these rear wheel connectors 326. The second stroller frame mount of this stroller includes a modified shuttle 330 to which the rear axles 322 are pivotally connected. The rear wheel links 324 are connected at one end to the respective rear wheel connector 326 and at the other end to a pivot mount 332 on the chassis body 302. As the shuttle 330 slides from the rear end of the chassis body 302 to the front end of the chassis body 302, the rear axles 322 and the rear wheel links 324 pivot to pull the rear wheels RW toward the chassis body 302. FIG. 23A thus shows the rear wheels in an in-use position, and FIG. 23B shows the rear wheels in a fold position.

It will be understood that, in other embodiments, the child seating area of a stroller with 3D fold capability can fold inward toward the center of the stroller to reduce its width.

As can be understood from the above description, the modular chassis has common design features that can be shared across multiple stroller platforms, such as umbrella strollers, lightweight strollers, standard strollers, bassinet-type strollers, full-size "comfort" class strollers, and jogging strollers. That is, a single stroller component (the modular chassis) can be utilized in the construction of several diverse stroller platforms. The modular design enables a common component to accommodate unique stroller features (e.g., frame configuration, front wheel assembly, rear wheel assembly) having unique attributes, thus creating a broad range of stroller utilities from which the consumer can choose. Thus, a consumer need not purchase multiple strollers for different utilities/applications; instead, the modular chassis provides a single main support structure that can be altered with different stroller frame configurations and different wheel assemblies to perform different tasks.

In addition, the modular chassis provides structural integrity for the stroller frame/child seating area and stroller components including, but not limited to wheels, brakes, and suspension.

Further, the modular chassis can be designed and configured to permit the stroller to accommodate other accessories including, but not limited to, a parent tray, a child tray, a storage basket, a reclining seat, a canopy, a foot rest, parent entertainment features, gear for different climates or weather conditions, and child entertainment features, like a toy bar. Features and accessories can be changed by the stroller manufacturer across stroller products, as well as by the consumer on an individual unit.

FIG. 25 illustrates yet another stroller embodiment that includes a modular chassis and that is particularly suited for two children. The modular chassis 400 of this embodiment has a length sufficient to carry two stroller frame configurations 402, 404. The modular chassis 400 can include a fixed stroller frame mount 406 and multiple slidable stroller frame mounts 408 to enable folding of the stroller frame configurations.

In yet another alternative embodiment of the invention, the modular chassis can be formed with a curve or bend so that the chassis body has a semi-horizontal portion and a semi-vertical portion that is directed in an upwards orientation (that is, away from a ground surface when the stroller is in an in-use position). This basic shape is as an "L" that accommodates a stroller frame configuration with a reclinable child seating area. Recline can occur along a track or rack system along the major axis of the "L," and a mechanical ratchet design may be used to recline or to raise the child seating area. The recline mechanism of this alternative embodiment can be a rotary knob that the consumer adjusts to set the angle of recline for the child. The recline mechanism can be located on the chassis body or on the child seating area of the stroller frame configuration. In addition, the recline mechanism can be stationary relative to the recline travel of the child seating area, or it can travel with the child seating area occurs in some conventional applications of recline in strollers.

Further, although the illustrated embodiments show a modular chassis with a single rail body, the modular chassis can be formed with multiple rails or beams. For example, one multiple rail embodiment can include two opposing parallel rails, offset from the center of the stroller, and the stroller frame members can track along the two rails when the stroller is folded. A multiple rail embodiment may offer improved resistance to front-to-back or side-to-side racking and may improve smoothness of the folding operation. Other multiple rail embodiments envision two, three, four, or more conventional tubes spaced from each other, or joined in a cluster, in a parallel arrangement to create a modular chassis. In yet another alternative embodiment, the single rail structure illustrated in the figures can be formed by discrete sections of rail joined together to form a single rail modular chassis. These discrete sections of rail can be in the form of traditional extrusions or tubes that are joined/fastened to create a rail-like structure.

The modular chassis of the invention enables consumers to change the stroller frame configuration to fit their needs. For example, it is envisioned that a consumer can purchase a first stroller with a modular chassis and a particular stroller frame configuration and, later, when consumer needs change, the consumer can purchase only the different stroller frame configuration suited for the changed needs, utilizing the modular chassis with the new, different stroller frame configuration.

The modular chassis of the invention also enables manufacturers to manage quality in one part for multiple stroller platforms. Manufacturers must ensure overall quality and durability for each stroller they produce. The stroller quality is managed at every intersection and fastened connection. One weak joint can compromise product integrity. By incorporating a modular chassis into a stroller product line, quality need only be managed in one part utilized in several stroller designs. In addition, the number of parts in the stroller product line is reduced, which positively impacts article inspection, cost, assembly, and quality control.

In this regard, a method of manufacturing a stroller system can include providing a first stroller frame configuration, providing a second stroller frame configuration different from the first stroller frame configuration, and providing a modular chassis having a body and at least one stroller frame mount on the body that is configured to couple releasably and interchangeably the first stroller frame configuration and the second stroller frame configuration. The method can further include providing a first front wheel assembly, providing a second front wheel assembly different from the first front wheel assembly, and providing a front wheel mount on the modular chassis to couple interchangeably the first and second front wheel assemblies. The method still further can include providing a first rear wheel assembly, providing a second rear wheel assembly different from the first front wheel assembly, and providing a rear wheel mount on the modular chassis to couple interchangeably the first and second rear wheel assemblies. The first stroller frame configuration can be coupled to the at least one stroller frame mount to form a first stroller. The second stroller frame configuration can be coupled to the at least one stroller frame mount to form a second stroller.

In addition, although in the illustrated embodiments the front wheel assembly, the rear wheel assembly, and the stroller frame configuration can be coupled releasably to the modular chassis, it is envisioned that, in other embodiments, those structures need not be releasable from the modular chassis. A modular chassis can be employed in and integrated into different strollers across the various stroller platforms. In such other embodiments, the modular chassis provides advantages associated with reduction in parts, streamlined quality control, and consequent reduced manufacturing cost, among other benefits recognizable to those in the industry.

The preferred embodiments have been set forth herein for the purpose of illustration. This description, however, should not be deemed to be a limitation on the scope of the invention. Various modifications, adaptations, and alternatives may occur to one skilled in the art without departing from the inventive concept.

What is claimed is:

1. A modular chassis of a stroller system, comprising:
    a body; and
    a first stroller frame mount and a second stroller frame mount on the body, the first and second stroller frame mounts configured to couple releasably and interchangeably a first stroller frame configuration and a second stroller frame configuration different from the first stroller frame configuration to the body, wherein the second stroller frame mount is slidably mounted to the body to move between an in-use position and a fold position so that a respective stroller frame configuration coupled to the first and second stroller frame mounts can fold relative to the modular chassis.

2. A modular chassis according to claim 1, wherein the first stroller frame mount comprises a bracket fixedly mounted to the body and a bracket cover movably mounted to the bracket to move between an open position and a closed position relative to the bracket.

3. A modular chassis according to claim 2, wherein the bracket is configured to receive a frame member of the respective stroller frame configuration.

4. A modular chassis according to claim 3, wherein the bracket includes a channel to receive the frame member of the respective stroller frame configuration.

5. A modular chassis according to claim 3, wherein, when the bracket receives the frame member and the bracket cover is in the closed position, the bracket and the bracket cover couple the respective stroller frame configuration to the body, and, when the bracket cover is in the open position, the respective stroller frame configuration can be decoupled from the body.

6. A modular chassis according to claim 2, wherein each of the first and second stroller frame configurations includes a locking bar, and the bracket is configured to couple releasably and interchangeably each respective locking bar of the first and second stroller frame configurations.

7. A modular chassis according to claim 6, wherein the bracket includes a channel to receive interchangeably each respective locking bar.

8. A modular chassis according to claim 6, wherein, when the bracket receives a respective locking bar of one of the first and second stroller frame configurations and the bracket cover is in the closed position, the bracket and the bracket cover couple the one stroller frame configuration to the body, and, when the bracket cover is in the open position, the one stroller frame configuration can be decoupled from the body.

9. A modular chassis according to claim 1, wherein the body includes a track, and the second stroller frame mount is slidably mounted to the track.

10. A modular chassis according to claim 9, wherein the second stroller frame mount comprises a shuttle slidably mounted to the body and configured to couple releasably and interchangeably the first and second stroller frame configurations to the body.

11. A modular chassis according to claim 1, wherein a rear wheel mount is connected to the second stroller frame mount and has a rear wheel assembly received by the rear wheel mount that can move between an in-use position and a fold position.

12. A modular chassis according to claim 1, further comprising an unfold assist mechanism connected to the second stroller frame mount to facilitate movement of the at least one stroller frame mount from a fold position to an in-use position.

13. A modular chassis according to claim 12, wherein the unfold assist mechanism includes at least one of a tension spring, a constant force spring, and a gas-charged cylinder.

14. A modular chassis according to claim 1, further comprising a fold assist mechanism connected to the second stroller frame mount to facilitate movement of the second stroller frame mount from an in-use position to a fold position.

15. A modular chassis according to claim 14, wherein the fold assist mechanism includes at least one of a tension spring, a constant force spring, and a gas-charged cylinder.

16. A modular chassis according to claim 1, further comprising a power assist mechanism connected to the second stroller frame mount to facilitate movement of the second stroller frame mount between an in-use position and a fold position.

17. A modular chassis according to claim 1, wherein the first stroller frame mount is fixedly mounted to the body.

18. A modular chassis according to claim 17, wherein the body has an upper surface and a track on the upper surface of the body, and the second stroller frame mount is slidable along the track.

19. A modular chassis according to claim 1, wherein a front wheel mount on the body is configured to couple interchangeably a first front wheel assembly and a second front wheel assembly, different from the first front wheel assembly, to the body.

20. A modular chassis according to claim 19, wherein the front wheel mount is located at a front end of the body.

21. A modular chassis according to claim 20, wherein the front wheel mount comprises a housing having a cavity formed to receive a front wheel connector of a respective front wheel assembly, a slot to receive a locking clip of the front wheel connector, and at least one release button mounted to the body of the modular chassis to release the locking clip from the slot.

22. A modular chassis according to claim 19, wherein the front wheel mount comprises at least one curved slot with an enlarged end formed at a front end of the body, wherein the enlarged end of the slot is configured to receive a tab on a front wheel connector of a respective front wheel assembly and the slot is configured to allow movement of the tab along the slot between a lock position and an unlock position.

23. A modular chassis according to claim 19, wherein the front wheel mount comprises a housing having a cavity formed to receive a front wheel connector of a respective front wheel assembly and a screw rotatably mounted to the housing to rotate between a lock position and an unlock position, and wherein the screw includes a slot configured to receive a tab on a front wheel connector of a respective front wheel assembly.

24. A modular chassis according to claim 1, wherein a front wheel mount on the body is configured to couple interchangeably a one-wheel assembly, a two-wheel assembly, and a four-wheel assembly to the body.

25. A modular chassis according to claim 1, wherein a rear wheel mount on the body is configured to couple interchangeably a first rear wheel assembly and a second rear wheel assembly, different from the first rear wheel assembly, to the body.

26. A modular chassis according to claim 25, wherein the rear wheel mount is located at a rear end of the body.

27. A modular chassis according to claim 25, wherein the rear wheel mount comprises a rear wheel axle, a first wheel connector at a first end of the rear wheel axle, and a second wheel connector at a second end of the rear wheel axle.

28. A stroller system, comprising the modular chassis of claim 1.

29. A modular chassis according to claim 1, wherein the body includes a track, and the second stroller frame mount is slidably mounted to the track.

30. A modular chassis according to claim 1, further comprising a rear wheel mount on the body, a first rear wheel assembly, and a second rear wheel assembly different from the first rear wheel assembly, wherein the rear wheel mount is configured to couple interchangeably the first rear wheel assembly and the second rear wheel assembly to the body.

31. A modular chassis according to claim 30, wherein the rear wheel mount is connected to the second stroller frame mount to enable movement of a respective one of the first and second rear wheel assemblies coupled to the rear wheel mount between an in-use position and a fold position.

32. A modular chassis according to claim 1, further comprising an unfold assist mechanism connected to the second stroller frame mount to facilitate movement of the second stroller frame mount from a fold position to an in-use position.

33. A modular chassis according to claim 1, further comprising a fold assist mechanism connected to the second stroller frame mount to facilitate movement of the second stroller frame mount from an in-use position to a fold position.

34. A modular chassis according to claim 1, further comprising a power assist mechanism connected to the second stroller frame mount to facilitate movement of the second stroller frame mount between an in-use position and a fold position.

35. A modular chassis according to claim 1, further comprising a front wheel mount on the body, a first front wheel assembly, and a second front wheel assembly different from the first front wheel assembly, wherein the front wheel mount is configured to couple interchangeably the first front wheel assembly and the second front wheel assembly to the body.

36. A modular chassis according to claim 1, further comprising a rear wheel mount on the body, a first rear wheel assembly, and a second rear wheel assembly different from the first rear wheel assembly, wherein the rear wheel mount is configured to couple interchangeably the first rear wheel assembly and the second rear wheel assembly to the body.

37. A modular chassis according to claim 1, wherein the body is hydroformed.

38. A modular chassis of a stroller system, comprising:
a body; and
at least one stroller frame mount on and slidably mounted to the body, the at least one stroller frame mount configured to couple releasably and interchangeably a first stroller frame configuration and a second stroller frame configuration different from the first stroller frame configuration to the body, wherein the at least one stroller frame mount comprises
a shuttle slidably mounted to the body;
a tube having a first end, a second end, and an intermediate portion mounted to the shuttle;
a first latch member at a first end of the tube; and
a second latch member at a second end of the tube, the first and second latch members being configured to couple releasably and interchangeably the first and second stroller frame configurations to the body.

39. A modular chassis according to claim 38, wherein the body includes a track, and the shuttle is slidably mounted to the track to move between an in-use position and a fold position so that a respective stroller frame configuration coupled to the first and second latch members can fold relative to the modular chassis.

40. A modular chassis according to claim 38, wherein the at least one stroller frame mount comprises a first stroller frame mount and a second stroller frame mount.

41. A modular chassis according to claim 40, wherein the body has a front end and a rear end, the first stroller frame mount is closer to the front end, and the second stroller frame mount is closer to the rear end.

42. A modular chassis according to claim 40, wherein the second stroller frame mount is slidably mounted to the body to move between an in-use position and a fold position so that a respective stroller frame configuration coupled to the first and second stroller frame mounts can fold relative to the modular chassis.

43. A modular chassis according to claim 42, wherein the body has an upper surface and a track on the upper surface of the body, and the second stroller frame mount is slidable along the track.

44. A modular chassis according to claim 42, wherein a rear wheel mount on the body is connected to the second stroller frame mount to enable movement of a rear wheel assembly received by the rear wheel mount between a rear wheel in-use position and a rear wheel fold position.

45. A modular chassis according to claim 42, further comprising an unfold assist mechanism connected to the second stroller frame mount to facilitate movement of the second stroller frame mount from the fold position to the in-use position.

46. A modular chassis according to claim 45, wherein the unfold assist mechanism includes at least one of a tension spring, a constant force spring, and a gas-charged cylinder.

47. A modular chassis according to claim 42, further comprising a fold assist mechanism connected to the second stroller frame mount to facilitate movement of the second stroller frame mount from the in-use position to the fold position.

48. A modular chassis according to claim 47, wherein the fold assist mechanism includes at least one of a tension spring, a constant force spring, and a gas-charged cylinder.

49. A modular chassis according to claim 42, further comprising a power assist mechanism connected to the second stroller frame mount to facilitate movement of the second stroller frame mount between the in-use position and the fold position.

50. A modular chassis according to claim 38, wherein each of the first and second stroller frame configurations includes first and second frame latch member to couple to the first and second latches of the at least one stroller frame mount, respectively.

51. A modular chassis according to claim 38, wherein the body includes a track, and the shuttle is slidably mounted to the track to move between an in-use position and a fold position so that a respective one of the first and second stroller frame configurations coupled to the first and second latch members can fold relative to the modular chassis.

52. A modular chassis of a stroller system, comprising:
a body having an elongate rail including a longitudinal track; and
at least one stroller frame mount on the body, the at least one stroller frame mount configured to couple releasably and interchangeably a first stroller frame configuration and a second stroller frame configuration different from the first stroller frame configuration to the body, wherein the at least one stroller frame mount is slidable along the longitudinal track so that a respective stroller frame configuration coupled to the at least one stroller frame mount can fold relative to the modular chassis.

53. A modular chassis according to claim 52, wherein a front wheel mount is at a front end of the rail, and a rear wheel mount is at a rear end of the rail.

54. A modular chassis of a stroller system, comprising:
a body; and
at least one stroller frame mount on the body, the at least one stroller frame mount configured to couple releasably and interchangeably a first stroller frame configuration and a second stroller frame configuration different from the first stroller frame configuration to the body, wherein a front wheel mount located on a front end of the body is configured to couple interchangeably a first front wheel assembly and a second front wheel assembly, different from the first front wheel assembly, to the body, and wherein the front wheel mount comprises a housing having a cavity formed to receive a front wheel connector of a respective front wheel assembly, a lever movably mounted to the housing, and a cam mounted to the lever and extending within the cavity to engage the front wheel connector when the lever is in a lock position and to disengage the front wheel connector when the lever is in an unlock position.

55. A modular chassis of a stroller system, comprising:

a body; and at least one stroller frame mount on the body, the at least one stroller frame mount configured to couple releasably and interchangeably a first stroller frame configuration and a second stroller frame configuration different from the first stroller frame configuration to the body, wherein a rear wheel mount on the body is configured to couple interchangeably a first rear wheel assembly and a second rear wheel assembly, different from the first rear wheel assembly, to the body, and wherein the rear wheel mounts are configured to couple interchangeably a one-wheel assembly and a two-wheel assembly to the body.

56. A modular chassis of a stroller system, comprising:

a body; and at least one stroller frame mount on the body, the at least one stroller frame mount configured to couple releasably and interchangeably a first stroller frame configuration and a second stroller frame configuration different from the first stroller frame configuration to the body, wherein first and second rear wheel assemblies each is selectable independently from the group consisting of a two-wheel assembly and a four-wheel assembly and mountable to the modular chassis.

* * * * *